United States Patent [19]

Caldwell

[11] 4,103,564
[45] Aug. 1, 1978

[54] LIMITED SLIP DIFFERENTIAL

[75] Inventor: Samuel I. Caldwell, Aurora, Ill.

[73] Assignee: Caterpillar Tractor Co., Peoria, Ill.

[21] Appl. No.: 751,565

[22] Filed: Dec. 17, 1976

[51] Int. Cl.² .................................................. F16H 35/04
[52] U.S. Cl. ...................................................... 74/650
[58] Field of Search .......................................... 74/650

[56] References Cited

U.S. PATENT DOCUMENTS

| 1,920,994 | 8/1933 | Lawler | 74/650 |
|---|---|---|---|
| 1,934,721 | 11/1933 | Lawler | 74/650 |
| 1,939,756 | 12/1933 | Arnold | 74/650 |
| 2,193,803 | 3/1940 | Christensen | 74/650 |
| 3,491,604 | 1/1970 | Levi | 74/63 |

Primary Examiner—Benjamin W. Wyche
Assistant Examiner—Wesley S. Ratliff, Jr.
Attorney, Agent, or Firm—Phillips, Moore, Weissenberger, Lempio & Majestic

[57] ABSTRACT

A limited slip differential is adapted for use in self-propelled wheeled vehicles requiring maximum available tractive effort. The differential utilizes a gearless design for differentiation and compact gearing therewith for reliability and increased limited slippage characteristics. The preferred differential embodiment comprises a housing having a slide block mounted therein for relative reciprocation in a first plane perpendicular to a longitudinal axis of the differential. A pair of first gear members, each having teeth formed internally thereon, are disposed on either side of the slide block and are keyed thereto for relative reciprocation in a second plane and longitudinal axis. A pair of second gear members, each adapted for securance to a drive axle and having teeth formed externally thereon, are rotatably mounted in the housing. Each second gear meshes with a respective first gear and has a lesser number of teeth to form a cycloidal gear set whereby each first gear will orbit in a circular path about the longitudinal axis of the differential, allowing its meshing second gear to rotate in a direction opposite thereto. A cross-over control means is pivotally interconnected between the slide block and first gears to assure that the drive axles will rotate in opposite directions during all phases of differentiation.

60 Claims, 26 Drawing Figures

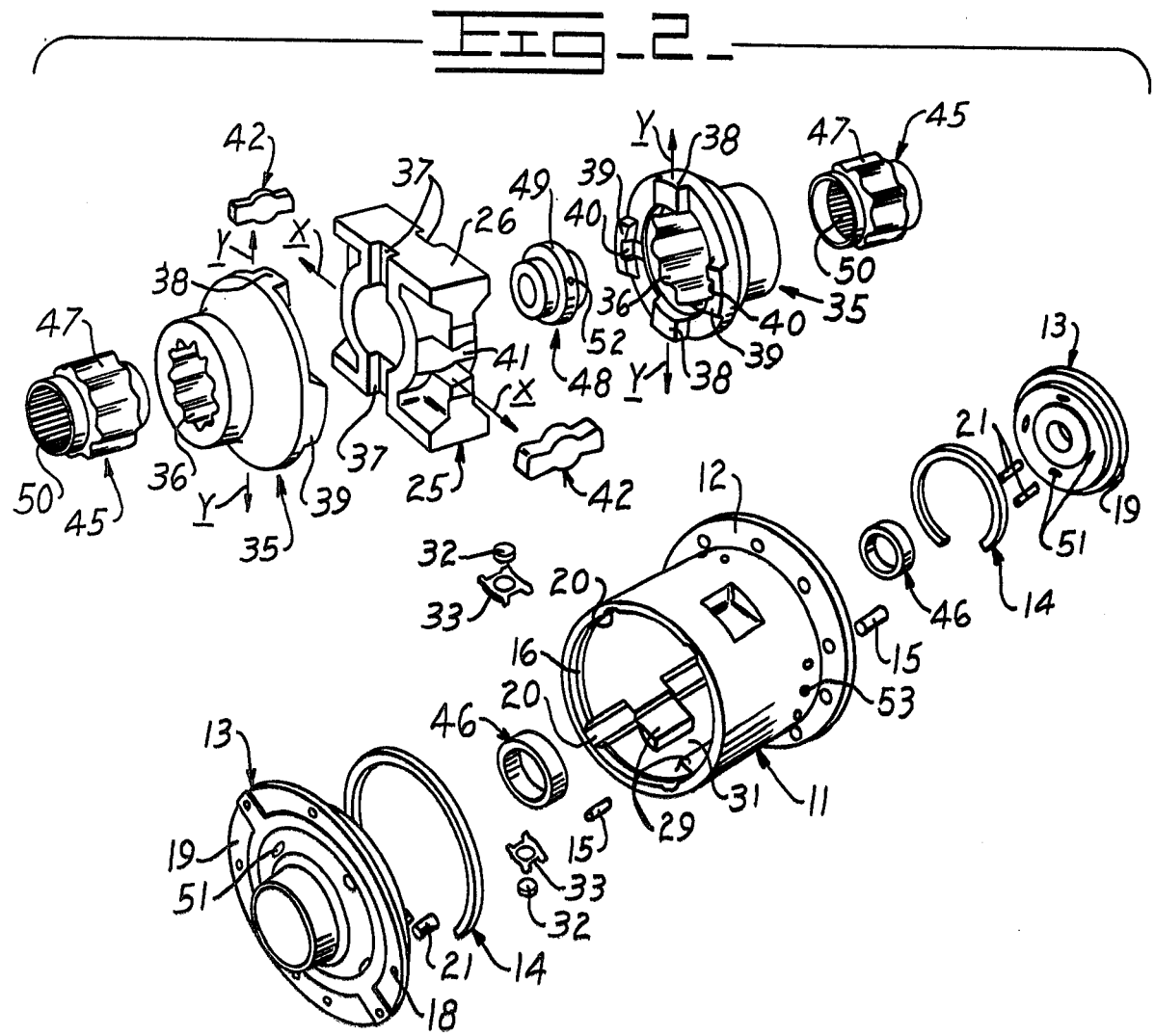

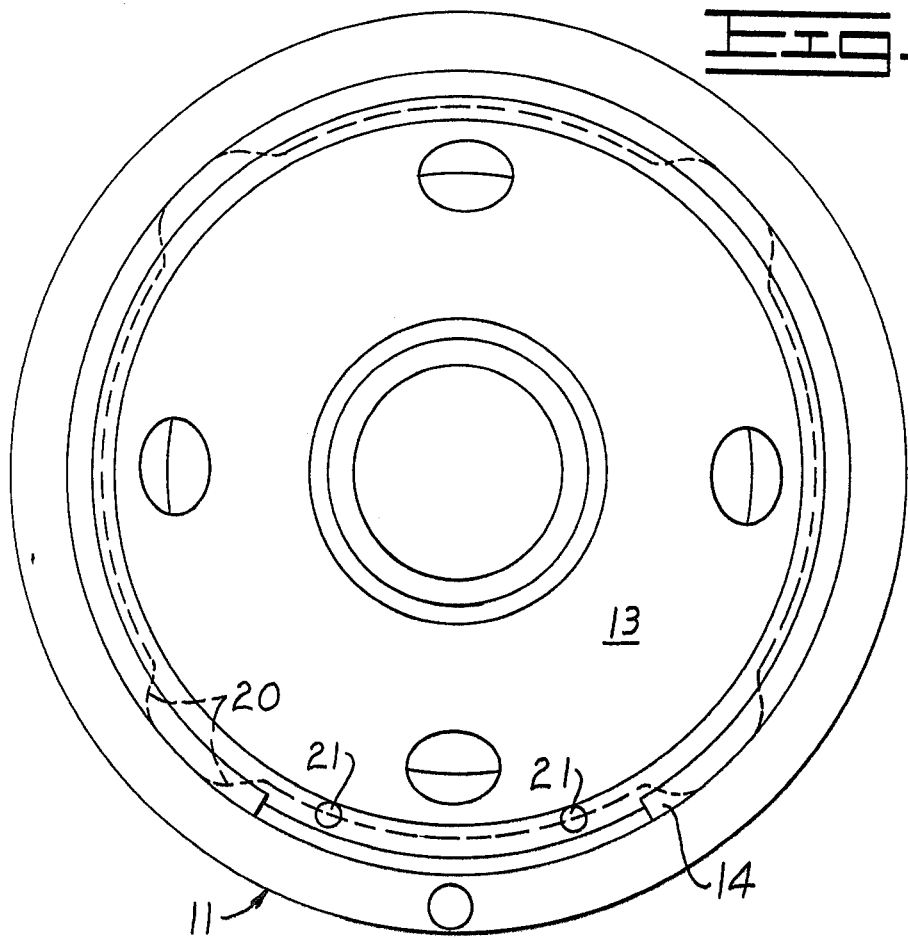
Fig_7_
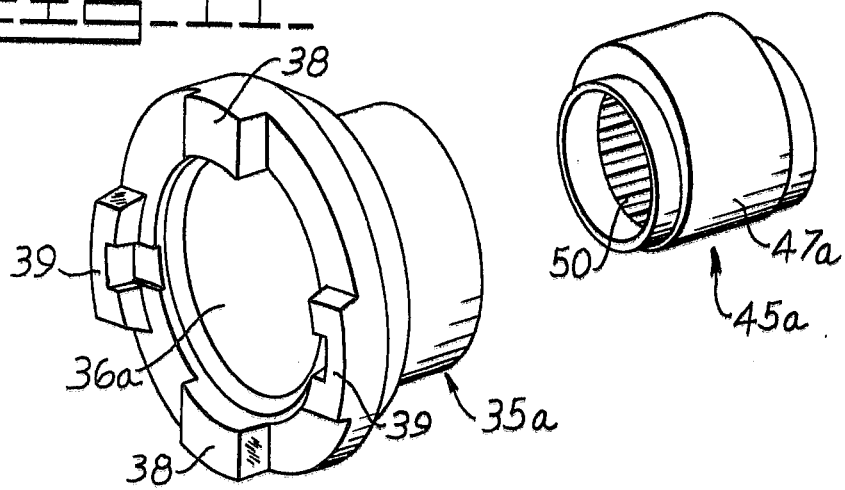
Fig_11_
Fig_12_

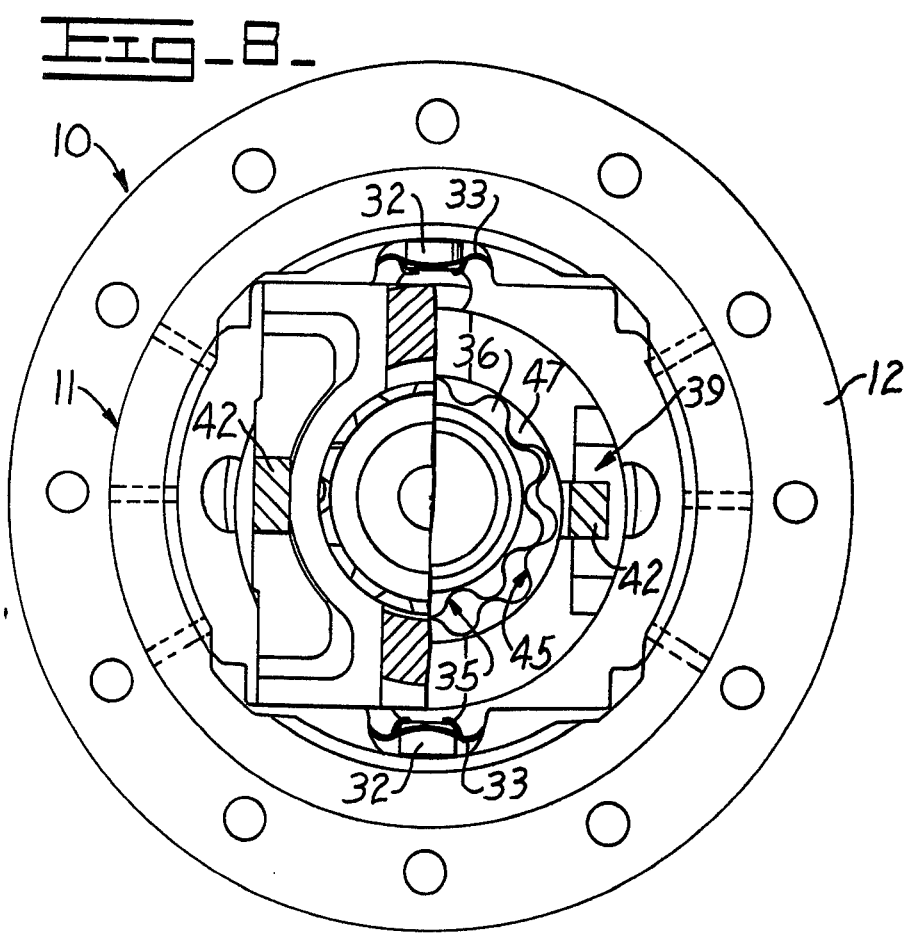
Fig-8-
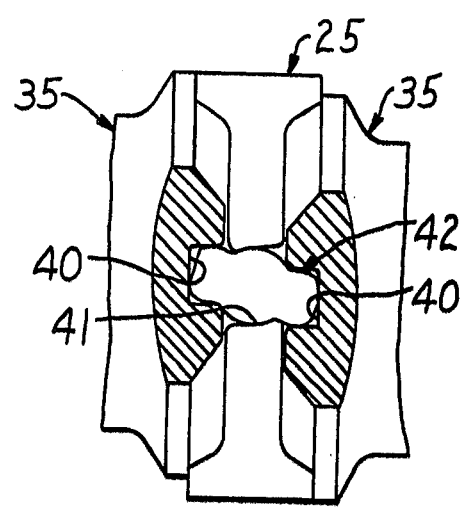
Fig-9-

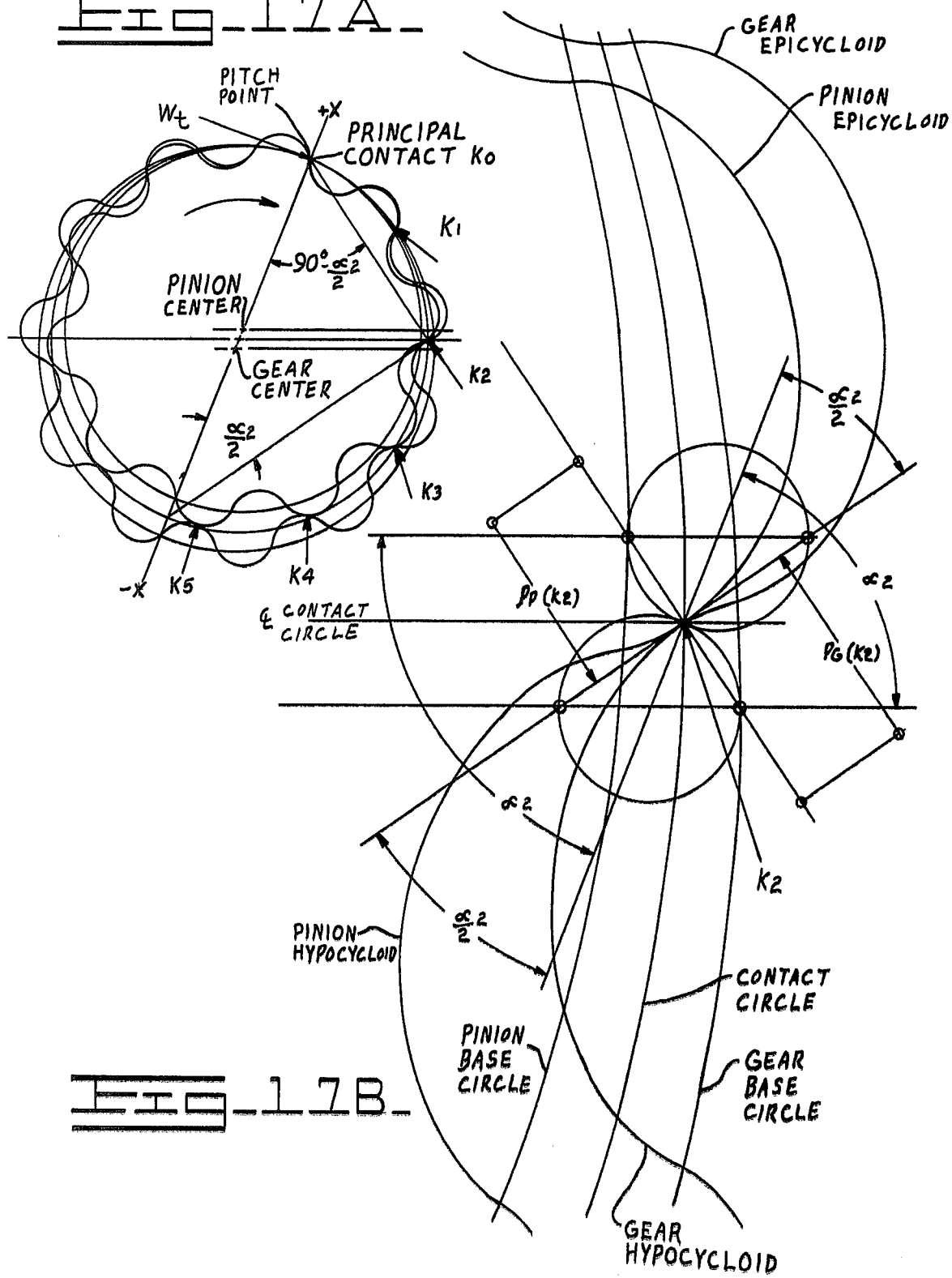

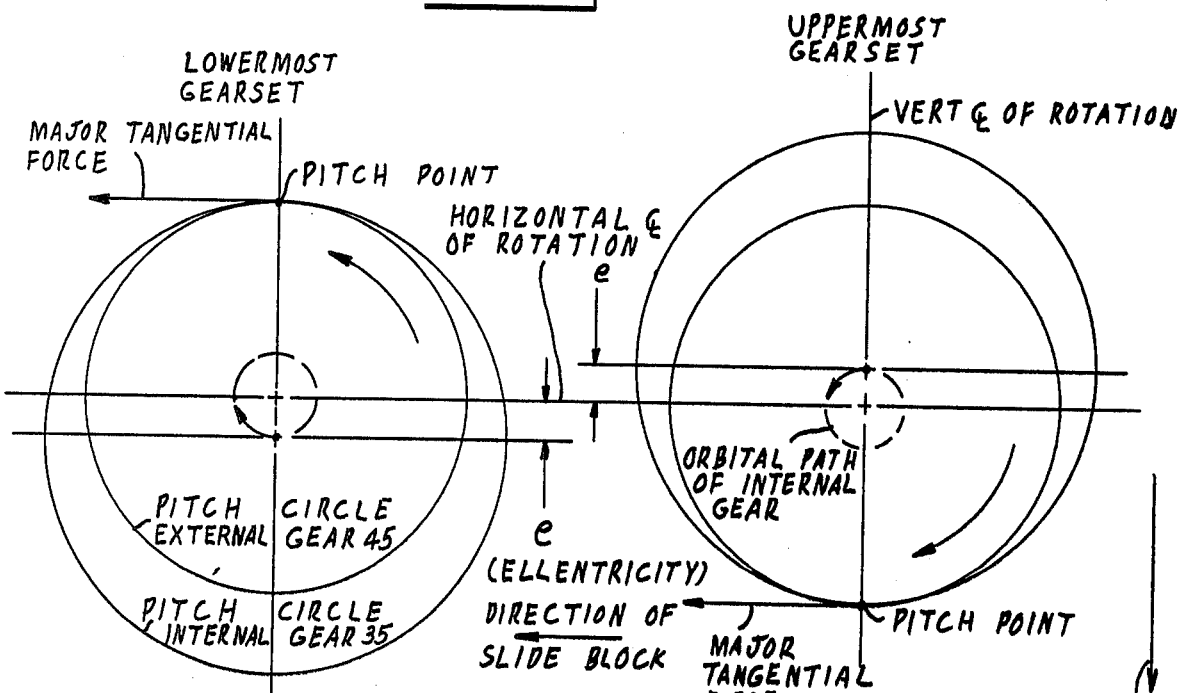
Fig_18.
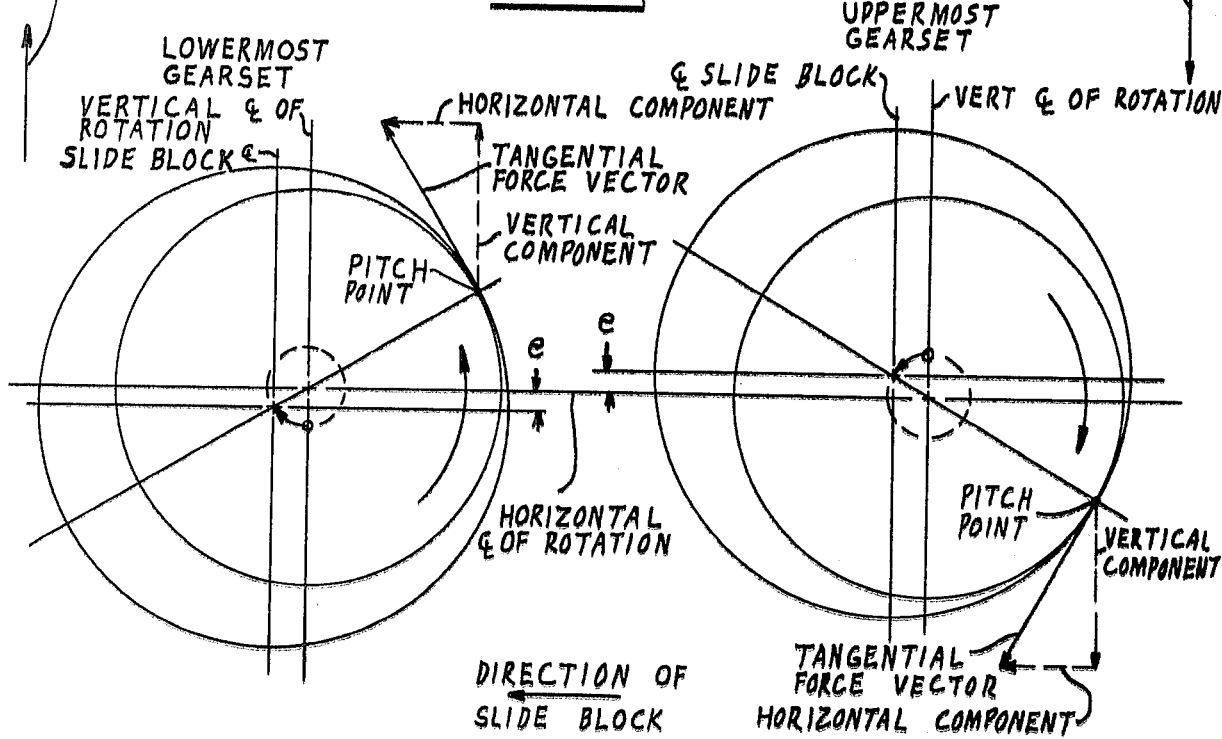
Fig_19.

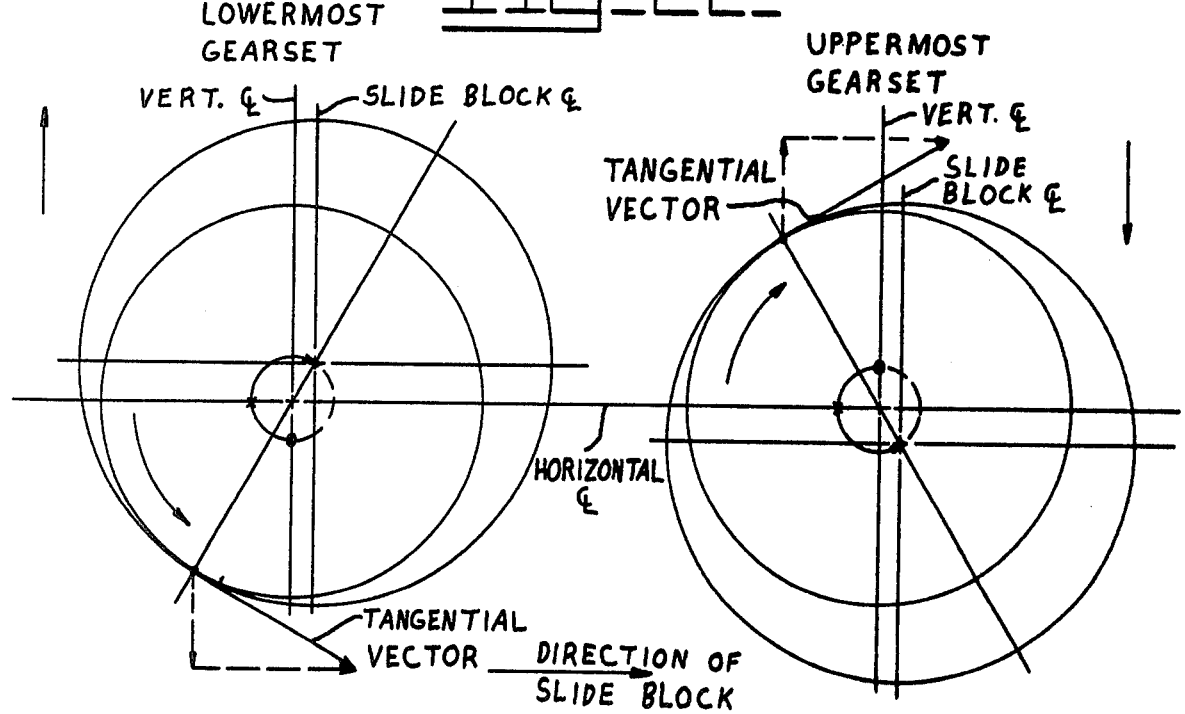
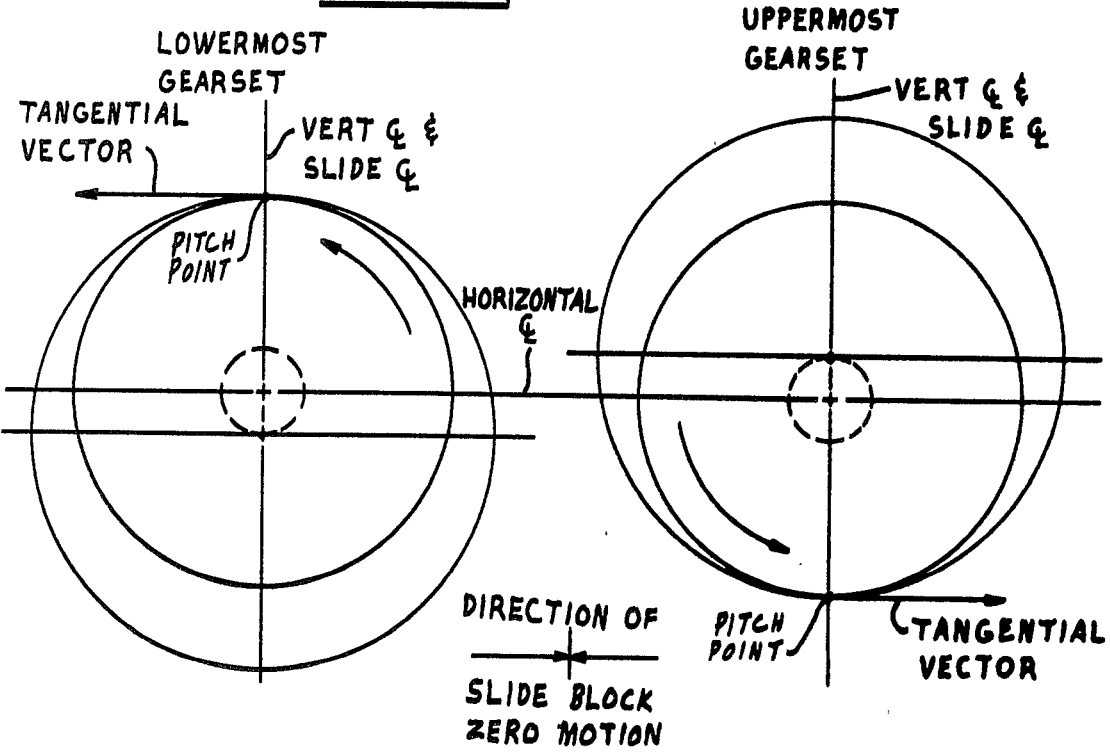

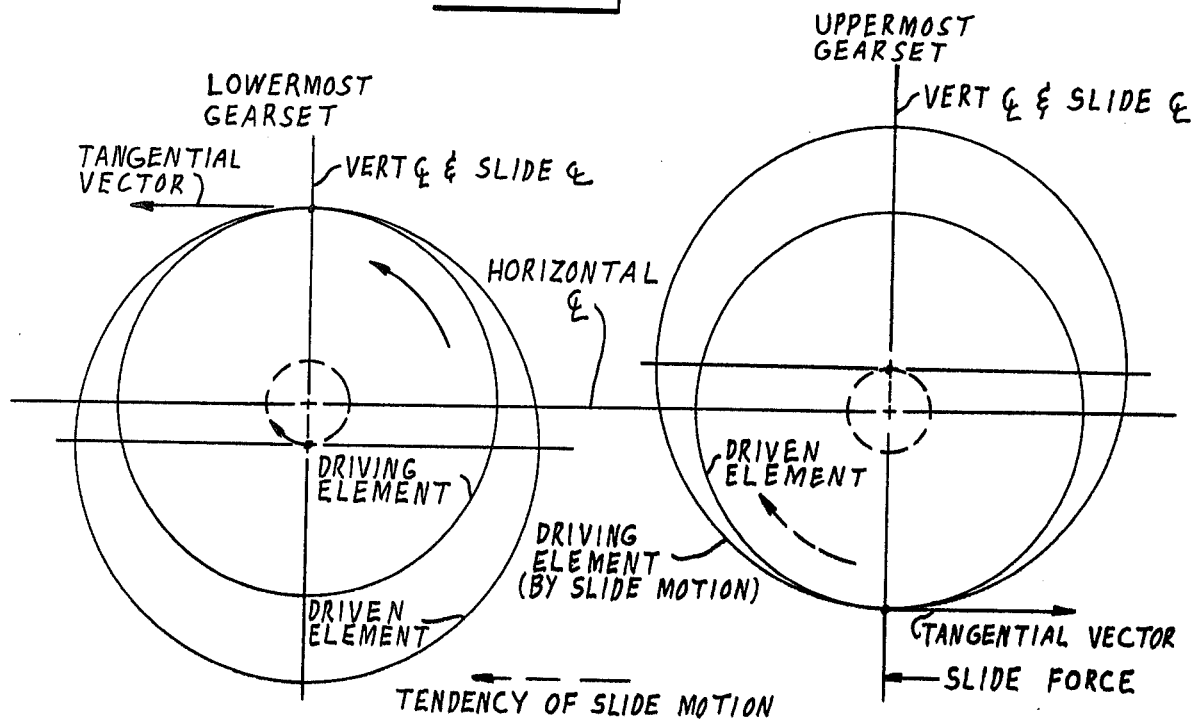
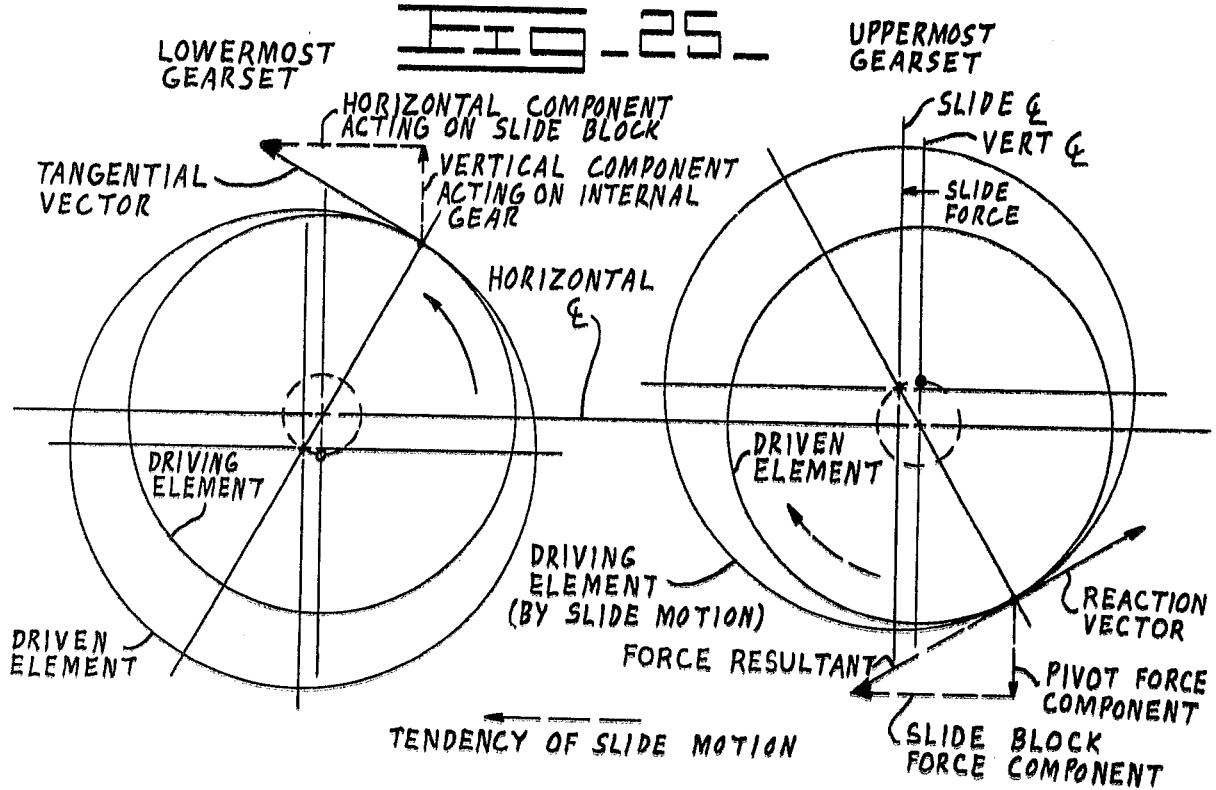

LIMITED SLIP DIFFERENTIAL

BACKGROUND OF THE INVENTION

This invention relates to a limited slip differential adaptable as an intra-axle differential intermediate the two wheel-driving components of a single drive axle assembly on a self-propelled vehicle for appropriately distributing torque to the driving components in instantaneous response to varying torque demands therebetween, and/or as an inter-axle differential intermediate the front and rear drive axle assemblies on a vehicle having two drive axles for appropriately distributing torque to the two axle assemblies in response to the varying torque demands therebetween.

The necessity of a differential between two mechanically driven coaxial wheels of a shelf-propelled vehicle has long been established, and the desirability of an ideal limited slip differential in this and other applications has long been recognized.

The automotive driving axle differential in most common use at this time is essentially the same as the original one invented some one hundred and fifty years ago. Its characteristics allow the vehicle to negotiate turns and uneven terrain and to compensate for differences in the rolling radii of the driving wheel tires while maintaining equal torque distribution to the two driving wheels. The algebraic sum of the rotational velocity of the two axle shafts is always equal to the rotational velocity of the differential housing. These characteristics are usually recognized as the reasons why the design has endured the evolution of the self-propelled vehicle.

The disadvantages of the conventional differential are also equally well recognized. Tractive conditions inadequate to support locomotion encountered by one wheel of the pair limits the usable torque distributed to the opposite wheel to the same magnitude, and the wheel with the lesser traction spins, stalling the progress of the vehicle. Also, during periods of adequate traction, if one driving wheel should bounce and lose contact with the road surface, that wheel accelerates while in the air and slips upon subsequent reengagement with the road surface causing tire scuffing, heat build-up, and excessive wear due to cutting from contact with sharp-edged objects it would normally be expected to roll over without damage.

Many experts in the fields of power train technology and vehicle performance have analyzed these problems, and the following statements appear to form a consensus of what is required.

The ideal vehicle drive differential should:

1. Allow normal differential action to occur as when compensating for uneven terrain or unequal tire rolling radii, or when cornering.
2. Function automatically and promptly in response to transient variations in tractive conditions encountered by either of the vehicle's driving wheels.
3. Allow maximum utilization of available traction.
4. Cause no adverse effect on the stability or on the handling characteristics of the vehicle.
5. Prevent wheel spinning when either driving wheel traction diminishes as long as the opposite wheel has adequate traction.

Obviously, there are other aspects to be considered. The design should be simple, practical, and economical to produce and assemble. It should be strong and reliable with adequate service life expectancy, and it should not require periodic servicing or adjustments. It should operate efficiently and, therefore, not be wasteful of energy and it should be quiet.

While some of the prior art differentials have satisfied some of the above criteria, none are known to have complied completely, and most have caused additional problems in one or more of the categories enumerated. An example of this would be a limited slip differential comprising one or more spring-loaded friction-type clutch disc packs which impede the normal rotation of the side differential gears, restricting differential action to a pre-set torque level. Below this pre-set torque level, no differential action can occur, with consequent tire scuffing and interference with normal steering capability of the vehicle. Above this pre-set torque level, differential action occurs, but it requires more power to cause it to occur, and the slipping clutch discs generate heat and wear rapidly, causing frequent replacement and/or gradual reduction in the pre-set torque level, accompanied often times with noise known as "chatter."

GENERAL OBJECTS AND SUMMARY OF THE INVENTION

The primary object of this invention is to provide a limited slip differential for wheeled vehicles which substantially overcomes the prior art problems and fulfills the requirements discussed above. The differential, adaptable to intra-axle and/or inter-axle applications in heavy duty, wheel-mounted, self-propelled vehicles requiring maximum available tractive effort, utilizes a gearless design for differentiation with economy and simplicity, and combines efficient, compact gearing therewith for reliability and increased limited slippage characteristics. Complementary interreaction between the two axle components allows conventional differential action during favorable tractive circumstances; however, loss of said interreaction during periods of unequal traction causes driving component to axle component interreaction, to effect uninterrupted power flow to axle component experiencing greater traction.

SUMMARY OF THE PREFERRED EMBODIMENT

The preferred limited slip differential of this invention comprises a housing having a slide block mounted therein for rotation therewith. The slide block is further mounted in the housing to permit relative reciprocation in a first plane perpendicular to a longitudinal axis of the differential. A pair of first gear members are disposed on either side of the slide block and each gear member has a plurality of circumferentially disposed gear teeth formed internally therein.

Inter-engaging guide means are formed on the slide block and on each of the first gear members for permitting the gear members to reciprocate on the slide block in a second plane which is perpendicular relative to the above-mentioned first plane and also relative to the differential's longitudinal axis. A pair of second gear members are mounted for rotation in the housing and each has gear teeth formed externally thereon which mesh with the teeth of a respective one of the first gear members. The teeth of each second gear member are less in number than the teeth formed in each first gear member whereby each pair of first and second gear members form a cycloidal gear set wherein the first gear members are adapted to orbit eccentrically in a circular path, relative to the differential's longitudinal axis, and thereby allow the second gear members to rotate within the housing in a direction counter to the direction in which the mating first gear is orbiting.

A cross-over control means is pivotally interconnected between the slide block and the first gear members to assure that driven axles attached to the second gear members rotate in opposite directions during all phases of differentiation. In addition, means are provided for continuously supplying lubricating oil to the various interreacting parts and gear tooth contacts.

Although the above-described cycloidal gear sets are preferred due to their structural integrity and related desiderata, other types of gearing or eccentric journals could be substituted in lieu thereof to effect the orbital function.

BRIEF DESCRIPTION OF THE DRAWINGS

Other objects of this invention will become apparent from the following description and accompanying drawings wherein:

FIG. 2 is an exploded view of the differential;

FIG. 7 is a transverse sectional view, taken in the direction of arrows VII—VII in FIG. 3;

FIG. 8 is a transverse sectional view of the differential, generally taken in the direction of arrows and along the lines VIII—VIII in FIG. 4;

FIG. 9 is a view of cross-over control means employed in the differential, taken in the direction of arrows IX—IX in FIG. 4 and partially broken-away for clarification purposes;

FIGS. 11 and 12 are isometric views of modified intermediate and driven members, respectively, employed in the differential; and FIGS. 13–25 diagrammatically illustrate operational characteristics of this invention as they relate to preferred gear differential embodiment thereof.

DETAILED DESCRIPTION OF PREFERRED EMBODIMENT

Figure 1:
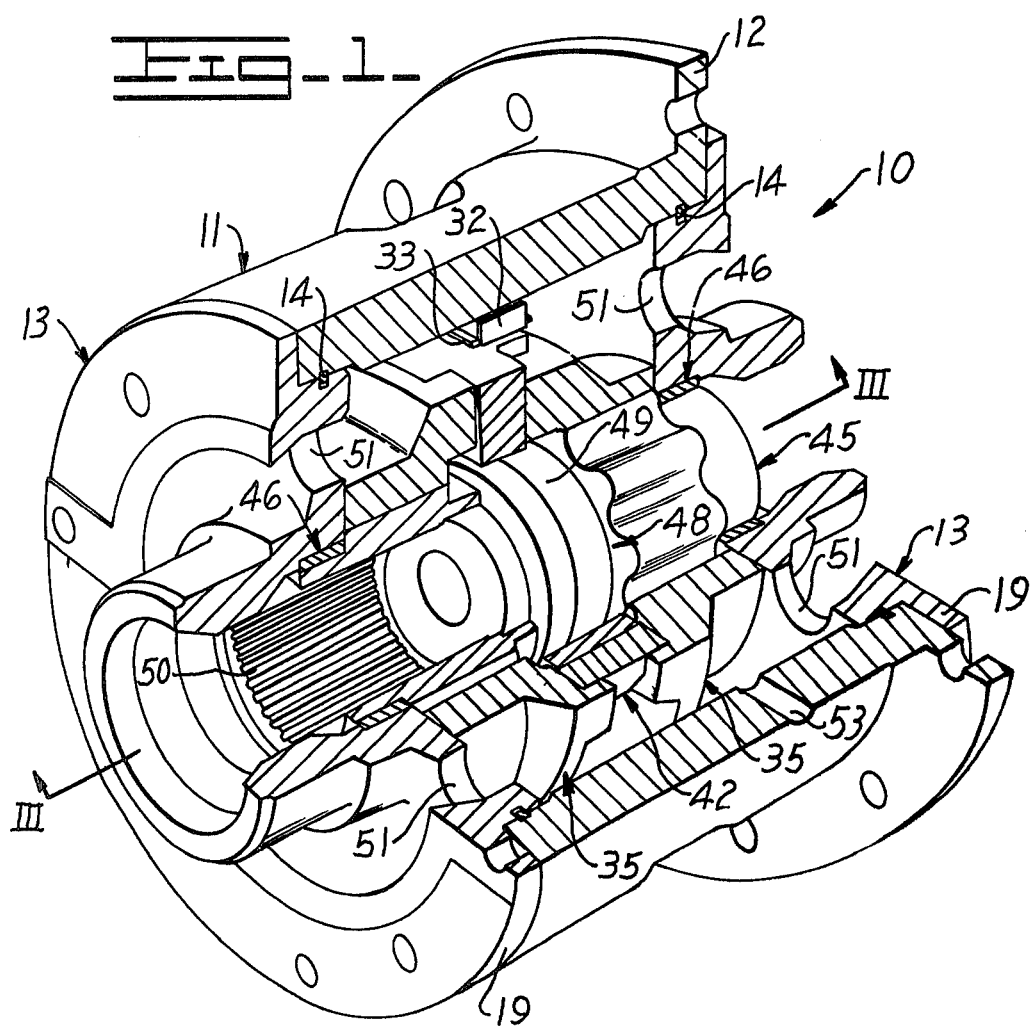
FIG. 1 is a cut-away perspective view of a limited slip differential embodying this invention.

FIG. 1 illustrates a limited slip differential 10 comprising a housing 11 having a generally cylindrical shape and further having a radial flange 12 formed on one end thereof. As will become apparent and as clearly illustrated in FIG. 2, the majority of working components of the differential are provided in pairs and thus identical numerals will be employed to depict corresponding and interchangeable parts. For example, a pair of flanged end plates 13 are each releasably attached on opposite ends of the housing to form an enclosure, by a semi-annular snap ring 14 and a single positioning dowel 15.

Referring to FIGS. 3–7, each snap ring is semi-circular (e.g. approximately 296°) and is expanded into locked relationship within an annular groove 16 formed in the housing and a second annular and circumferentially aligned groove 17 formed in a respective one of the end plates. A plurality of circumferentially disposed holes 18 are formed through a flange 19 of end plate 13, with each hole being disposed in axial alignment with a slot 20, formed internally on housing 11. The aligned holes and slots are adapted to accommodate a plurality of wedge-shaped tools T (FIG. 6) to retract ring 14 into groove 17 for disassembly purposes.

Figure 5:
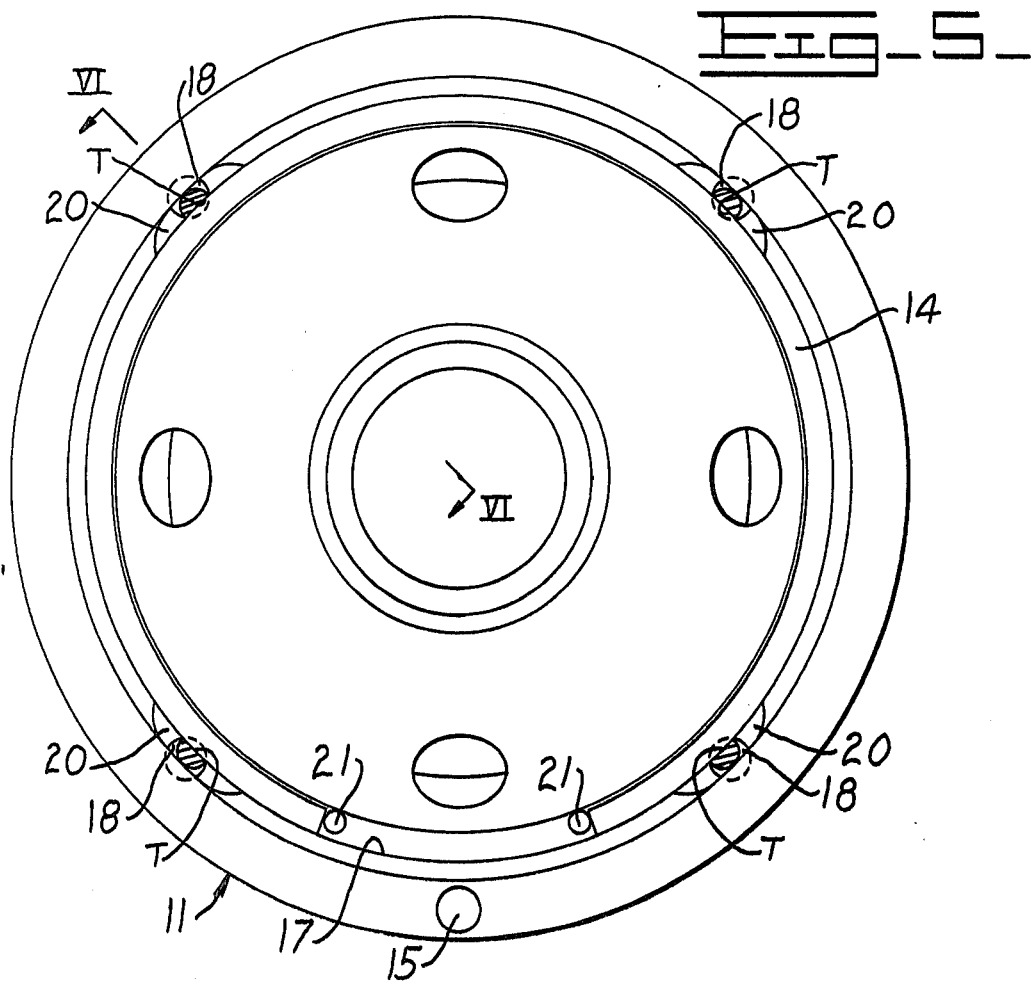
FIG. 5 is a transverse sectional view, taken in the direction of arrows V—V in FIG. 3.
Figure 6:
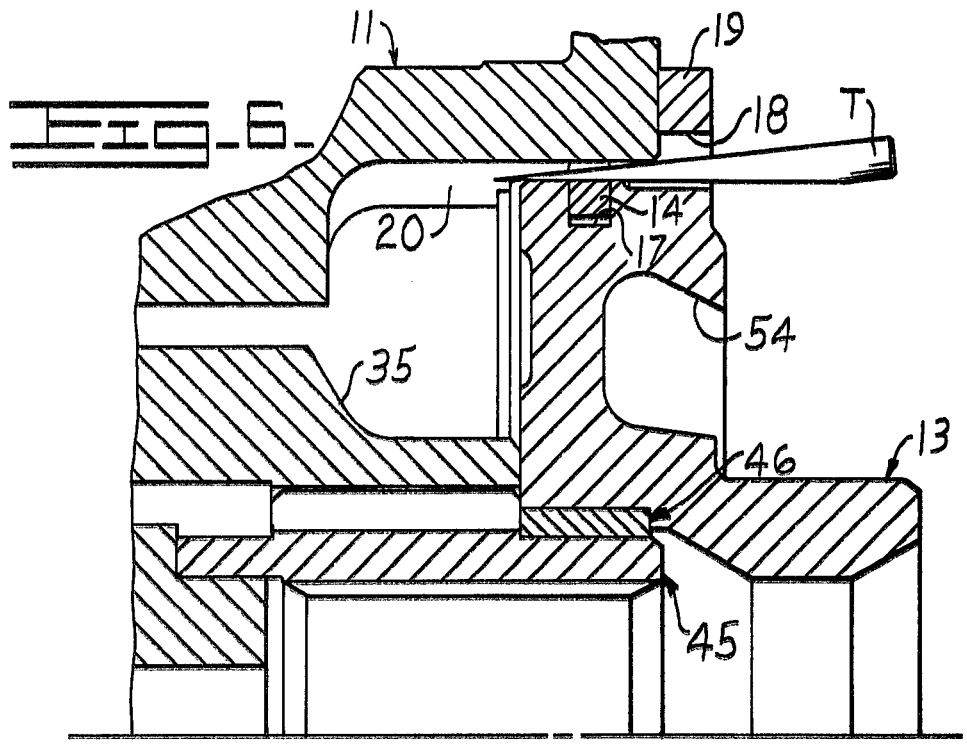
FIG. 6 is a sectional view, taken in the direction of arrows VI—VI in FIG. 5.

In order to assure that snap ring 14 is properly positioned in groove 17 of end plate 13 to align with slots 20 in housing 11 so that a portion of the snap ring is presented to each of holes 18 to enable tools T capability of retracting the snap ring, a pair of spring-pins 21 are each disposed in a hole formed on a back side of an end plate 13. As shown in FIG. 5, the hole and residing pin intersect groove 17 providing abutting relationship with the ends of ring 14 as it is compressed into groove 17 to clear the bore in the end of housing 11 during assembly of the end plate into the housing. Dowels 15 serve to maintain this angular interrelationship of parts and also to resist any torsional forces that may tend to displace end plate 13 circumferentially with respect to housing 11 during differentiation.

Referring to FIGS. 1–4, a slide block 25 is disposed within housing 11 to rotate therewith and to reciprocate in a first direction X which is perpendicular relative to the longitudinal and rotational axis A (FIG. 3) of the differential. In particular, parallel upper and lower flat bearing surfaces 26 and 27 of the slide block slidably engage flat and parallel bearing surfaces 28 and 29 of the housing, respectively. A pair of diametrically opposed cutouts 30 and 31 interrupt bearing surfaces 28 and 29 of the housing, respectively, to each accommodate a magnet 32 therein which is held in place on the housing by a suitably dimensioned spring clip 33. (FIG. 8).

Figure 3:
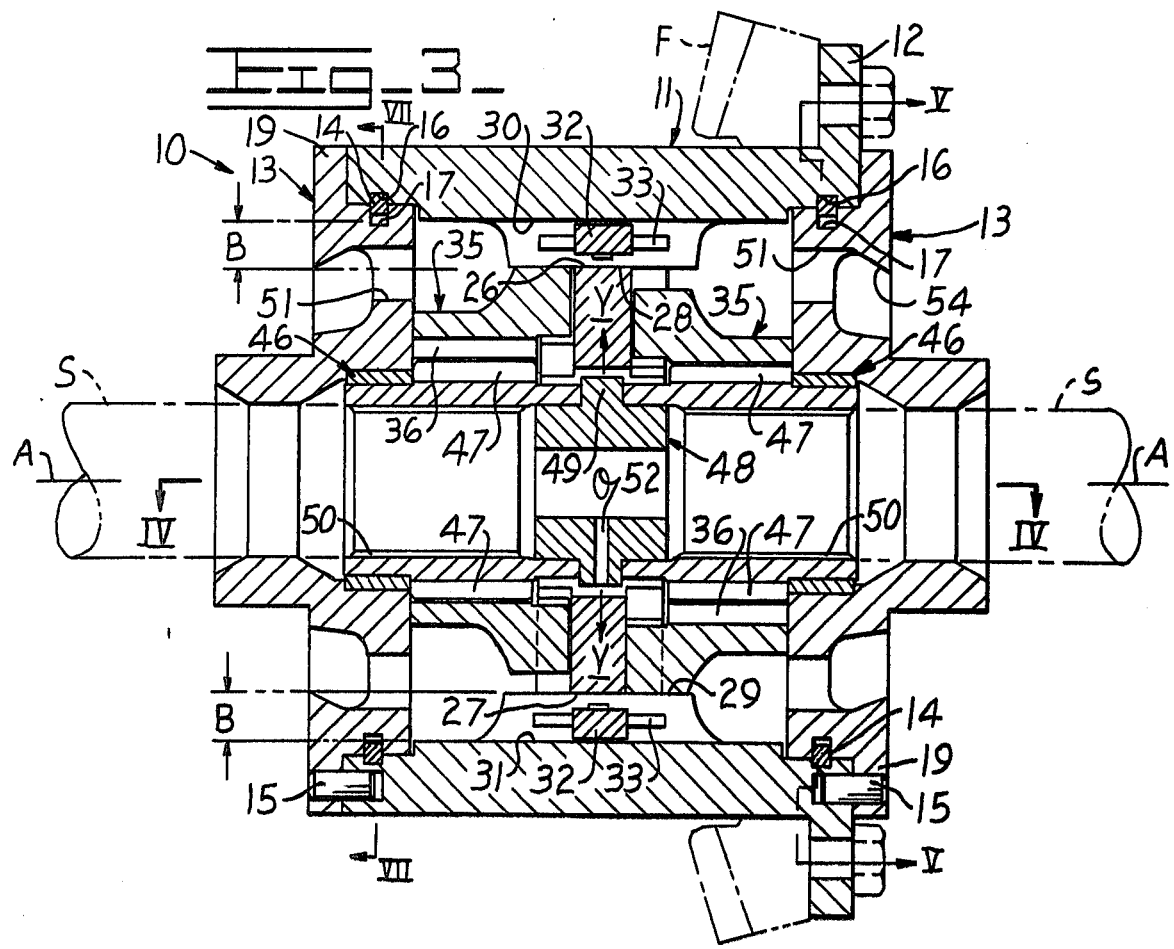
FIG. 3 is a longitudinal cross-sectional view of the differential, generally taken in the direction of arrows III—III in FIG. 1, and further illustrating a pair of driven axles and a driving bevel gear in phantom lines.
Figure 4:
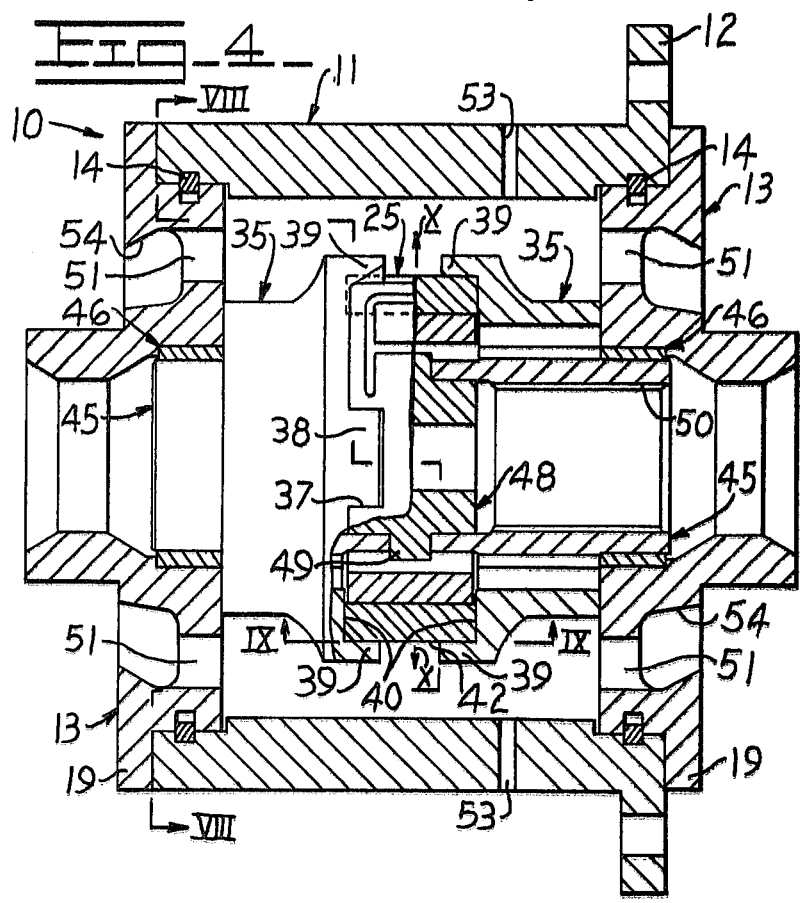
FIG. 4 is a longitudinal cross-sectional view of the differential, taken in the direction of arrows IV—IV in FIG. 3.

A pair of axially spaced intermediate or first gear members 35 are disposed on either side of slide block 25 and each has first driving means in the form of gear teeth 36 formed internally thereon. Inter-engaging guide means, preferably in the form of slots 37 formed on opposite sides of the slide block and diametrically opposed tangs 38 formed on the inboard face of each first gear member permit the first gear members to reciprocate on the slide block in a second direction Y which is perpendicular relative to first direction X and also to rotational axis A of the differential (FIGS. 2–4). A pair of diametrically opposed guide lugs 39, circumferentially offset ninety degrees from tangs 38, are also formed on the inboard face of each first gear member to straddle outboard sides of the slide block.

As more clearly shown in FIGS. 1, 2, and 4, each lug 39 has a cut-out 40 formed therein whereas each side of slide block 25 has a cut-out 41 formed therein. Upon assembly, each pair of axially aligned cut-outs 40 of first gear members 35 receive the opposite ends of a pivot member 42 therein, as more clearly shown in FIG. 9. The intermediate, semi-circular portion of the pivot member is disposed in like-shaped cut-out 41 of the slide block to provide a cross-over control means, hereinafter fully described.

Referring again to FIGS. 1–3, a pair of axially spaced and aligned driven or second gear members 45 are each mounted for rotation on a respective end plate 13 by a cylindrical bearing sleeve 46 which is press-fitted into a recess bored in end plate 13. Each second gear member has second driving means in the form of gear teeth 47 formed externally thereon which mesh with, and are one less in number than gear teeth 36 formed internally on a respective one of first gear members 35, to form a cycloidal gear set therewith. The inboard ends of the second gear members are cylindrical and are each slip-fitted onto the hub of an annular spacer 48 to abut opposite sides of a radial and separating flange 49 formed intermediate its axial length.

As shown by phantom lines in FIG. 3, a pair of driven axles S, adapted for connection to a road wheel in a conventional manner, or to axle assemblies in an interaxle application, may be connected internally of each second gear member 45 by splines 50, formed internally thereon. In addition, a driving bevel gear F may be releasably attached to radial flange 12 of housing 11 to provide the drive input thereto via the drive line from an internal combustion engine.

The differential is suitably mounted for rotation in a stationary carrier (not shown) which also supports and encloses the pinion (not shown) meshed with the gear F, which carrier is conventionally mounted on an axle housing, forming enclosure means suitable for containing lubricant. The axle housing (not shown) is filled, in a static condition, approximately to the level of the differential longitudinal axis A with a lubricating oil. Tapered roller bearing means (not shown) are employed for rotatably mounting the differential to the carrier. The natural pumping action of these bearings on the lubricant during rotation directs a flow of oil toward a conical cavity 54 in the outboard end of each end plate 13 (FIG. 3).

Centrifugal force on the oil due to differential housing rotation causes the oil in the conical cavities to flow axially inwardly of the housing via interconnecting ports 51. During housing rotation, the oil will continuously submerge bearing surfaces 26-29 due to centrifugal force which will form a cylinder of lubricating oil to an approximate radial depth B (FIG. 3) in the housing. Ferrous metallic wear particles which may be in the oil are attracted to and removed from suspension by magnets 32 positioned within the cylinder of oil. Radial ports 53 provide egress of the oil from the housing and are positioned to cause the expelling oil to impinge on the driving gear mesh, assisting in lubrication of those members.

The exiting oil also assists in conducting from the differential any heat which may tend to be generated by interior moving parts. The exiting ports 53 are substantially smaller in size and fewer in number than entering ports 51 so that oil is not expelled faster than it can enter. Whenever the vehicle is stopped, oil floods the interior of the differential, bathing all contacting surfaces and entering the interior of spacer 48 through ports 52, partially filling the space between the ends of axle shafts S and the spacer 48. The spline connections are thus bathed in oil to inhibit fretting corrosion therebetween. Oil is also trapped between the outboard ends of second gear members 45 and the cavities formed in the interior of the end plates 13.

Differential motion then allows oil trapped in this way to lubricate the interfaces between gears 45 and spacer 48 and the interfaces between gears 45 and bearing sleeves 46. Oil escaping these interfaces must flow past the grooves 37 and tangs 38, and past pivot members 42 and their associated cut-outs 40 and 41, and between the orbiting gears 35 and inner faces of end plates 13. Spaces between contacting teeth 36 and 47 on gears 35 and 45, respectively, are partially flooded whenever the vehicle is stopped.

Subsequent orbiting of gear members 35 about gear members 45 during differentiation causes displacement of this portion of oil as the spaces between the contacting teeth change in volume (FIG. 8), effectively pumping the oil into the areas of higher sliding velocity contact so that a film of oil is always present between the gear teeth contacts. Oil may ingress also through the opening obtained between the shafts S and the central hole in end plates 13 to lubricate bearing sleeves 46 and thereafter replenish oil exhausted from the orbiting gear meshes. It is apparent from the foregoing that a reliable oil circulation system has abeen provided to effectively lubricate and cool the differential, obviating auxiliary oil pumping devices.

Figure 10:
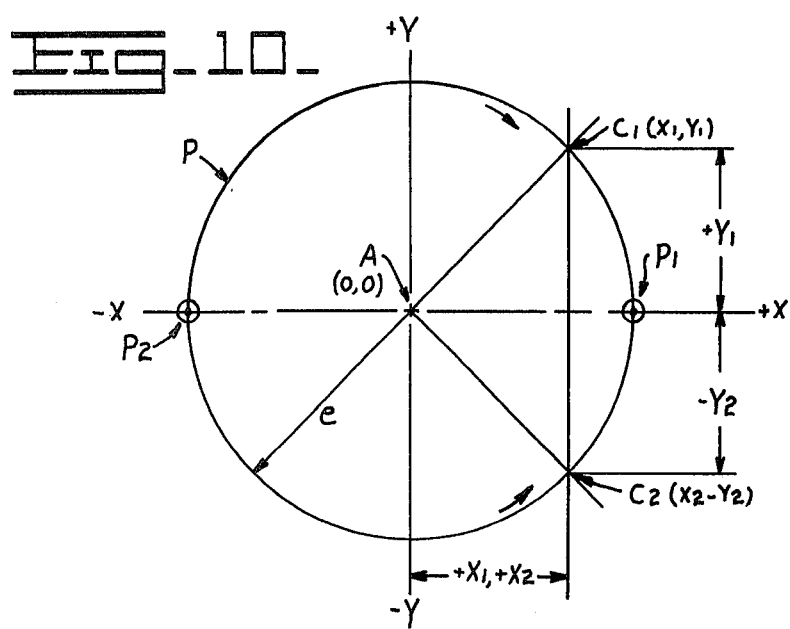
FIG. 10 is an analysis of operational characteristics of a gearless or geared differential.

FIG. 10 diagrammatically illustrates, to an enlarged scale, orbital paths of eccentricity of the centers of the two intermediate members or the centers of the two first gear members, relative to rotational axis A, during normal phase of differential motion. Axis A is located at the origin, (0,0), of a coordinate axis system of analytic geometry, where the circle, P, of radius, $e$, is shown centered on the origin. Points $C_1$ and $C_2$ depict the geometric centers of the orbiting intermediate members, respectively, or the geometric centers of the orbiting internal gears 35, which orbit symmetrically in opposite directions in circular path, P, to effect differentiation.

As further illustrated, center $C_1$ is shown as moving in a clockwise direction, for example, and is instantaneously disposed at a position $(+X_1, +Y_1)$ in its orbit, whereas center $C_2$ is moving counterclockwise and is simultaneously disposed at a position $(+X_2, -Y_2)$ in its orbit. Upon continued orbiting of centers $C_1$ and $C_2$ towards each other, they will first become superimposed or crossover each other at point $P_1$ on the positive X-axis in the orbit. Continued orbital motion of centers $C_1$ and $C_2$ will cause divergence until the centers cross the Y-axis, and then convergence until point $P_2$ is reached on the negative X-axis, where the centers will once again become coincident.

It should be noted in FIG. 10 that abscissa $-X$, $+X$ depicts the maximum sliding movements and reciprocation of slide block 25 relative to housing 11, and in the X directions illustrated in FIGS. 2 and 4. Ordinate $-Y$, $+Y$ indicates the maximum sliding movements and reciprocation of each of the intermediate or first gear members relative to the slide block and in the Y directions illustrated in FIGS. 2 and 3. In the example gearing used herein, where the pitch is 3.5 and the tooth combination is ten and eleven, the magnitude of sliding motions in both planes, or the diameter of the orbit circle is equal to 1 ÷ 3.5, or approximately 0.286 inches. For further definition, refer to the section on "Description of Differential Operation."

During normal differentiation, axles S (FIG. 3) will always rotate in opposite directions simultaneously and relative to each other, regardless of whether or not housing 11 is also rotating. If axles S were driving the mechanism at all times, the points $P_1$ and $P_2$ on the paths of orbit would only be of passing interest because of the coincidental positions of centers $C_1$ and $C_2$. However, when the axles S are being driven by the mechanism, the points $P_1$ and $P_2$ represent not only coincidental positions of centers $C_1$ and $C_2$, but also the positions of reversal of motion of the slide block, where the orbital motions of the intermediate members or first gear members could both reciprocate in the same direction. This condition cannot be allowed because similarly directed motion of centers $C_1$ and $C_2$ would allow dissipation of driving energy through mere reciprocation of internal parts, without transmitting torque to the driven members. The provision of the cross-over control means in the preferred form of the pivot members prevents unidirectional orbiting of the intermediate members or the first gear members whenever the points $P_1$ or $P_2$ are approached by centers $C_1$ and $C_2$. Thus, the pivot members assure that any time that orbiting and reciprocation occur, the orbiting and reciprocation of the intermediate members or the first gear members will always be in opposing directions.

FIGS. 11 and 12 illustrate components of an alternate, "Gearless" differential embodying this invention which also functions in accordance with the operational characteristics illustrated in FIG. 10. As suggested above, other types of gearing and eccentric journals may be substituted in lieu of cycloidal gear sets 35, 45, if so desired. FIGS. 11 and 12 illustrate one type of eccentric journal which can be so substituted and wherein corresponding constructions are depicted by identical numerals, but with numerals depicting modified constructions being accompanied by an "a".

Essentially, the FIGS. 11 and 12 embodiment differs from the first described embodiment in that each intermediate member 35 (FIG. 2) is replaced with a corresponding and modified intermediate member 35a and each driven member 45 is replaced with a corresponding and modified driven member 45a. Intermediate member 35a has a cylindrical cavity or bore 36a formed concentrically therethrough, adapted to slidably receive a cylindrical journal 47a of driven member 45a in rotational bearing relationship therein. The journal has an axis which is parallel and eccentrically offset relative to longitudinal and rotational axis A (FIG. 3) of the differential to thus constitute a crankshaft. This arrangement provides the differential with substantially the same operational characteristics as provided by meshing gear teeth 36 and 47 of the first described embodiment.

DESCRIPTION OF DIFFERENTIAL OPERATION

While many different kinds of differentials are known to exist, this discussion will be confined to the type wherein all motions of input or output are rotary. The following definition then applies: A differential is a mechanism having an internal reduction ratio of minus one, two coaxial shafts, and a housing that can rotate about their common longitudinal axis. The following principles are evident: With the housing fixed against rotation, the coaxial shafts can turn only in opposite direction, and when the housing rotates, its rotation is equal to the algebraic average of the rotations of the shafts, its direction of rotation being the same as the direction of rotation of the shaft having the greater absolute velocity. The equation of motion for the three elements is $C = (A+B)/2$ wherein A and B are numbers of revolutions or revolutions per minute of the two shafts, respectively, and C is the number of revolutions or revolutions per minute of the housing. Suitable signs (plus or minus) should be assigned to the quantities, so that the sign of quantity C can also denote direction of rotation of the housing, as well as the magnitude of housing rotation.

It can be seen that differential mechanisms can be used as adders or subtractors or doublers or halvers of angular displacements or rotary velocities, and they have been employed in analog computers for those purposes. In this mathematical context, the name, "differential," is a misnomer, since mathematical differentiation is not performed by differential mechanisms.

The automotive type differential is similar (except in size) to the analog computer differential. It may have one input and two output members or two input members and one output. Any one or all three members may be stationary. In the automotive application, any of the three basic members may assume the role of either input or output, depending on the conditions extant at that instant.

In the "gearless" version of this differential (e.g., FIGS. 11 and 12), as in most others, the coaxial (shaft) "driven" members interreact complementarily against each other to govern the kind of motion that the remaining parts within the housing will perform. When the "driven" members rotate in opposite direction, their associated eccentric journal centers orbit in the like opposite directions, carrying with them their associated intermediate members.

The intermediate members are each keyed in a common plane to the single sliding block in a fashion similar to that of an "Oldham" coupling so that the intermediate members can slide or reciprocate with respect to the sliding block in the common plane but not in the plane perpendicular to the common plane of the keys or slots. The block, however, is provided means of sliding or reciprocating in a plane that is perpendicular to the common plane of the intermediate members reciprocation, with respect to the housing. For this reason, the intermediate members can orbit in directions opposite to each other, but cannot rotate with respect to each other or with respect to the housing. If the two "driven" members rotate oppositely with the same velocity, then the sliding block merely reciprocates within the housing with a sinusoidal velocity and transmits no torque reaction to the housing since the torque imposed by each "driven" member only assists the opposite "driven" member, or complements the other "driven" member in its urging of the intermediate parts to reciprocate. This would describe the internal action which occurs when the vehicle articulates without locomotion.

Similar motion occurs when the vehicle is moving and, for example, negotiating a turn. In this case, the housing is the input member and the axle shaft members are primarily output members, as far as locomotion of the vehicle is concerned. However, with respect to differential motion, the axle shafts will not be rotating at identical velocities, since the wheel on the outside of the curve will have to travel farther than the wheel on the inside of the curve. With respect to the differential, the outboard axle is turning faster and the inboard axle is turning slower, or with respect to each other, the outboard axle is rotating forward while the inboard axle is rotating rearward, or in actuality, with respect to the differential housing, the axle shafts are counter-rotating. In this case, differentiation is occurring during locomotion so torques are being transmitted from the differential housing through the mechanism to the axle shafts. However, resisting torques are being imposed on the differential housing by the axles, and since these resisting torques are unequal, differentiation occurs.

As the vehicle straightens out of the curve, the differential motion diminishes to that of compensating for slight differences in rolling radii of the wheels or tires and to that of compensating for irregularities in the terrain being traversed.

If the two "driven" members are rotated at the same velocity in the same direction, the complementary interreaction of the two shafts does not occur. Rather, the two shaft torques now oppose each other such that any tendency of one shaft to initiate orbiting and consequent reciprocation of its associated intermediate member is instantaneously opposed by the other shaft's tendency to initiate orbiting and reciprocation of its intermediate member, causing the sliding block to be locked between them, tending to cause rotation of the block, which rotation is transmitted to the housing through the sliding bearing surfaces common between the sliding block and housing. Thus unidirectional rotation of the two axle shafts induces like rotation of the housing, and vice versa. This, then, is the condition wherein the housing is driving both axle shafts without differentiating. Theoretically, this would occur any time the vehicle is traversing a straight course. Practically, however, we know that some minute degree of differentiation is occurring continuously.

Because the eccentricity of the two "driven" members are equal and because the centers of the eccentric journals are counter-rotating whenever differential motion is occurring, the paths of the two journal centers will coincide or cross at only two places in their respective circular orbits (Points $P_1$ and $P_2$ in FIG. 10). At these two coincident points, it would be possible for one of the orbiting members to reverse its direction and orbit in the same direction of the other orbiting member, were it not for the presence of the pair of pivot members. If this similar direction of orbiting were to occur, any torques imposed on both shafts would be dissipated through the moving of parts with no useful work accomplished.

Both intermediate members and the slide block reciprocate together relative to the housing in the plane of reciprocation of the slide block. Because the centers of the intermediate members are counter-orbiting while remaining centered with the slide block slot, it follows that the individual intermediate centers are aligned only at the points of extreme travel of the block in its reciprocatory motion, or where the sliding block is momentarily stopped at the position of reversal of direction. At these two points, the sinusoidal velocity of the sliding block is zero. It is at these two points where the action of the pivot members is most effective. As the name suggests, each pivot member is pivotable on oppositely located recesses in the edge of the sliding block with opposite ends of the pivot protruding into slots in the inboard faces of each intermediate member (FIG. 9).

The block recess acts as a fulcrum so that any motion or force tending to cause reciprocation or any motion or force resulting from reciprocation of one intermediate member relative to the sliding block is simultaneously transmitted to the other intermediate member in the opposite direction. This interaction of pivot members continues throughout the entire orbit of the intermediate members but its effect is most pronounced at the cross-over points. During motion in reciprocation intermediate the two cross-over points, the slots in the block in cooperation with the tangs on the intermediate members transmit the majority of the forces involved.

LIMITED SLIP VERSION

In the limited slip version of this differential, the eccentrically positioned journal on the "driven" member is replaced with a full cycloidal profile external gear concentric with the rotational axis of the "driven" member. The concentric bearing bore of the intermediate member is replaced with an internal full cycloidal profile concentric gear having one tooth more than the number of teeth on the "driven" member. This cycloidal gear set has a center distance or eccentricity that is self-maintained solely by virtue of the contact relationship existing between the teeth of the two members. The effective lever arm of the mating parts is thus increased from the value of the eccentricity to the pitch radius of the external gear member, and the purely sliding contact of the eccentric journal is replaced by that of combined rolling and sliding where the major portion of the load is sustained in nearly pure rolling contact.

A more definitive description of the full cycloidal profile gear teeth appears to be pertinent at this point in the discussion. Definitions will be simplified if we may ignore operating clearances or backlash between the mating gears.

The terms, diametral pitch, circular pitch, angular pitch, pitch diameter, and circular tooth thickness, are identical to those employed in calculating involute profile spur gears, and are calculated and applied in exactly the same way as with involute gears. Other terms, however, are calculated differently for the full cycloidal profile gears, and they are; base circle diameter, major diameter, minor diameter, addendum and dedendum, whole tooth depth, and center distance.

In the full cycloidal profile gear geometry, the base circle is identical to the pitch circle. Its diameter is equal to the number of teeth on the gear divided by its diametral pitch. In both the external and internal gears, the major diameter equals the number of teeth increased by one, divided by the diametral pitch, and the minor diameter equals the number of teeth decreased by one, divided by the diametral pitch. The addendum is equal to the dedendum, and each is equal to the reciprocal of twice the diametral pitch. The whole tooth depth, therefore, equals addendum plus dedendum, or the reciprocal of the diametral pitch.

In both the external and internal gears, the portions of tooth profile occurring outside the base circle are full epicycloids and the portions of tooth profile lying within the base circle are full hypocycloids.

An epicycloid (FIG. 13) is a curve generated by a point on the circumference of a generating circle as it rolls, without slipping, in continuous contact tangentially about a stationary base circle. The curve is generated relative to the stationary base circle. A hypocycloid (FIG. 14) is a curve generated by a point on the circumference of a generating circle as it rolls, without slipping, in continuous tangential contact within a stationary base circle, relative to the stationary base circle.

Further study and understanding of these curves is simplified if we employ the coordinate system of analytic geometry, centering the base circle at the origin of the X and Y planes, starting the curve on the positive X-axis, and the center of the generating circle on the X-axis. Let the straight line connecting the base and generating circles rotate in the positive or counterclockwise direction. If we assign certain identities to the elemental values, we may then formulate equations describing mathematically various features of the curves.

Therefore, let the constants $a$ = Rolling radius of the generating circle, $b$ = Radius of stationary base circle with center at coordinate system origin, $c$ = Radius of orbit of center of generating circle.

And let the variables $X$ = Abscissa of the tracing point, P, on the generating circle, $Y$ = Ordinate of the tracing point, P, on the generating circle, $R$ = Radius vector of point, P. It is the radial distance from the origin of the coordinate system to the point, P. It is assumed to be positive.

$\epsilon$ = (EPSILON) Angle of positive (counter-clockwise) rotation of the straight line joining the centers of the generating and base circles, with respect to the positive X-axis, in degrees. It is the angle of generation, the roll angle of involute and cycloidal gearing.

$\alpha$ = (ALPHA) The angle on the generating circle subtended by the arc whose length is bounded by the initial point of contact with the base circle and the line joining the centers of the base and generating circles, in degrees.

$\rho$ = (RHO) Instantaneous radius of curvature of the curve at the point, P.

Figure 13:
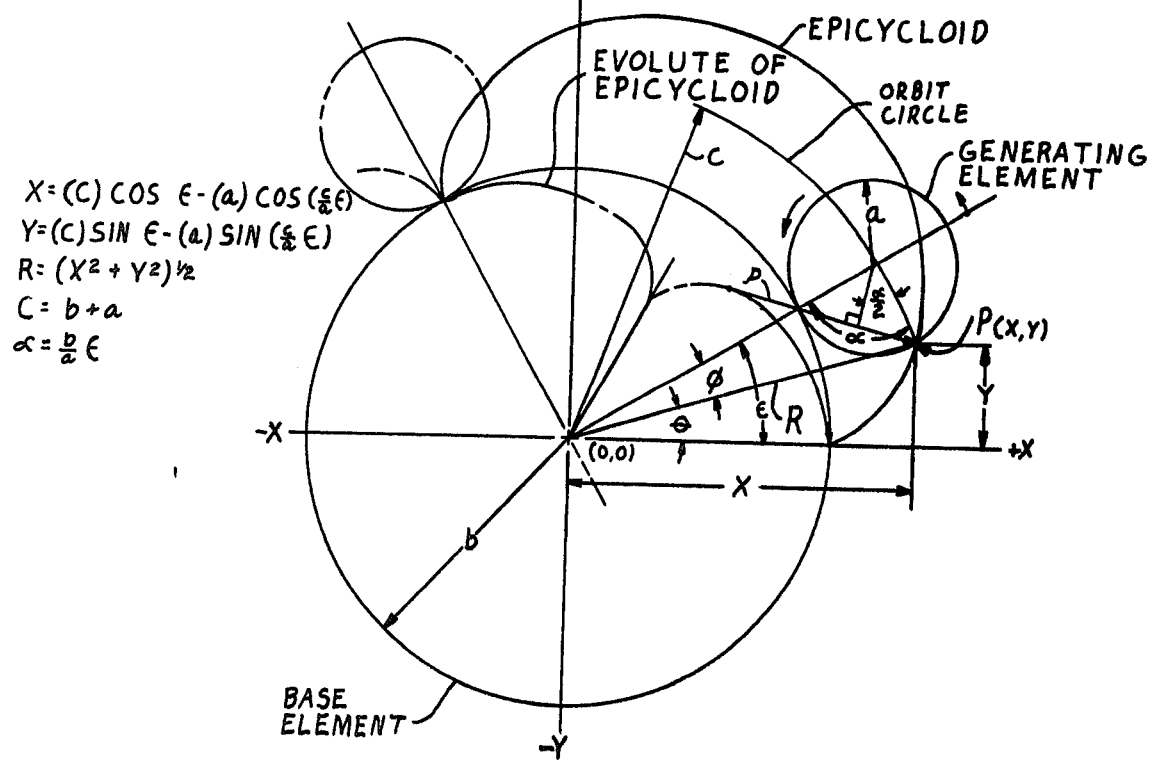
Figure 14:
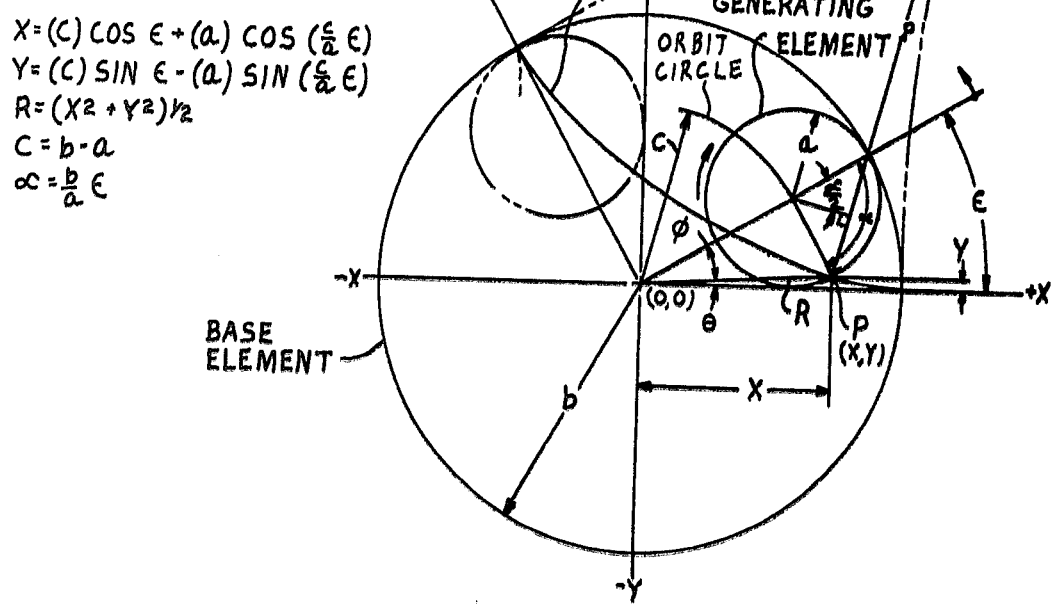

With respect to the epicycloidal curves illustrated in FIG. 13, $c = b + a$ and $\alpha = (b/a)\epsilon$, $(\alpha/2) = (b/2a)\epsilon$ $X = (c) \cos\epsilon - (a) \cos(c/a\epsilon)$ $Y = (c) \sin\epsilon - (a) \sin(c/a\epsilon)$ $R = (X^2 + Y^2)^{\frac{1}{2}}$ $\rho = (\frac{4ac}{c + a}) \sin(\frac{\alpha}{2})$ With respect to the hypocycloidal curves illustrated in FIG. 14, $c = b - a$ and $\alpha = (b/a)\epsilon$, $(\alpha/2) = (b/2a)\epsilon$ $X = (c) \cos\epsilon + (a) \cos(c/a\epsilon)$ $Y = (c) \sin\epsilon - (a) \sin(c/a\epsilon)$ $R = (X^2 + Y^2)^{\frac{1}{2}}$ $\rho = (-)(\frac{4ac}{c - a}) \sin(\frac{\alpha}{2})$ In both the epicycloidal and hypocycloidal curves, the relationships to both external and internal gears are:

base circle radius, $b$, is equal to the pitch circle radius or to the number of teeth on the gear divided by twice the diametral pitch, and the generating circle radius, $a$, is equal to the reciprocal of four times the diametral pitch.

The center distance or eccentricity of the external gear meshed with the internal gear having one tooth more than the external mate is equal to the reciprocal of twice the diametral pitch.

Figure 15:
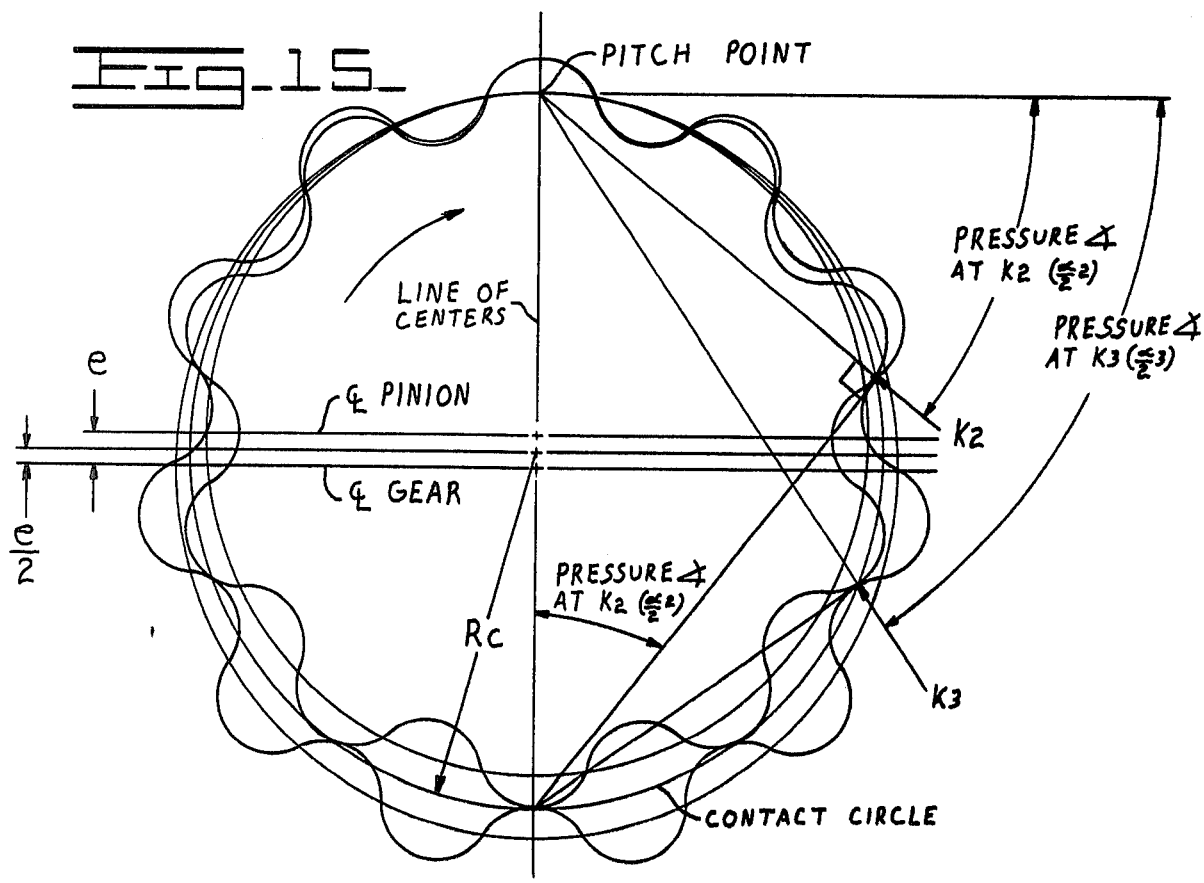
Figure 16:
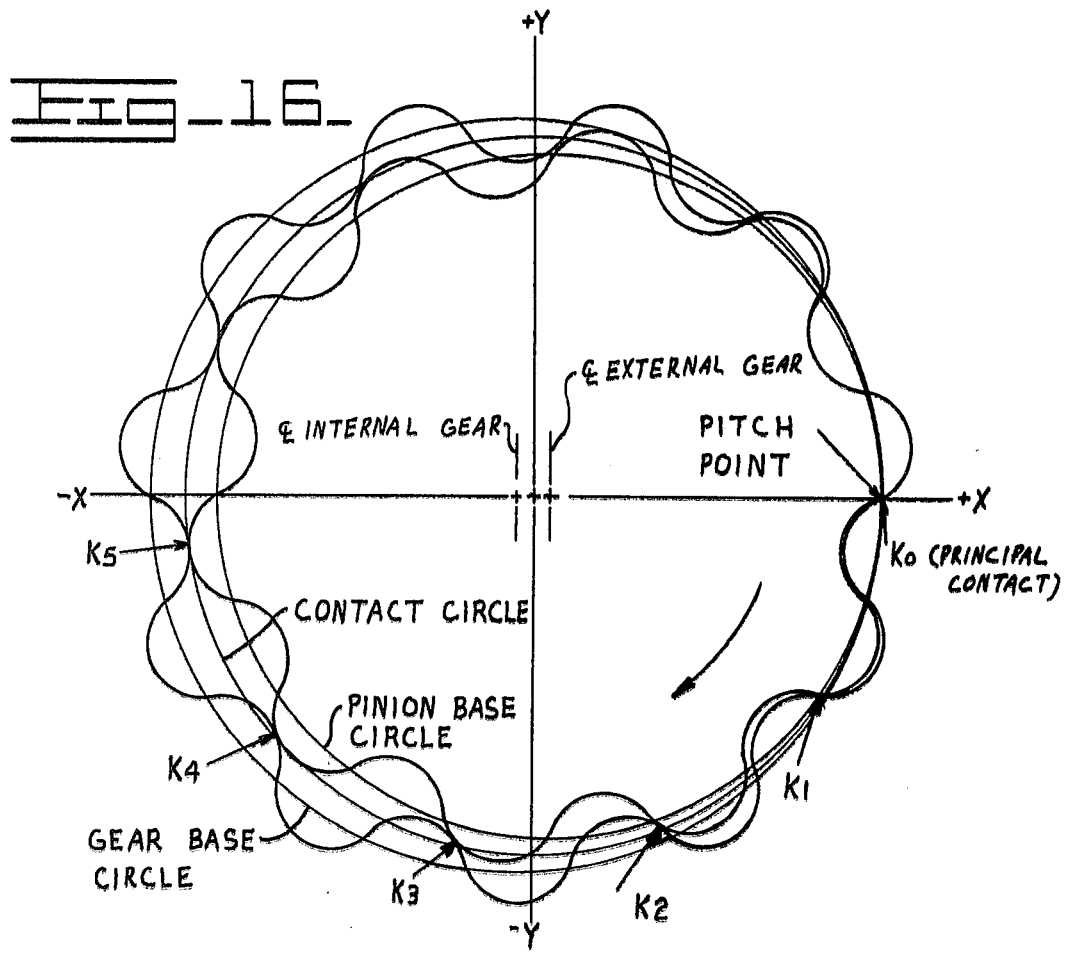

Referring to FIGS. 15-17, the pitch circles of the pair of internal/external gears are tangent to each other at all times, and this tangent point is known as the pitch point, as it is in involute gears. A radial straight line through the pitch point intersects the centers of both gears and is known as the line of centers. If the operating center distance (or the eccentricity) is bisected, and this point on the line of centers is used as a center, and a radius equal to the distance from this center to the pitch point is constructed or calculated, then the circle drawn from that center with that radius will pass through each and every tooth pair contact point, $(K_n)$. The circle thus constructed is called the contact circle and its radius is equal to the total number of teeth in both members times the reciprocal of four times the diametral pitch.

If straight lines are drawn from each tooth contact point, $(K_n)$ to the two points where the line of centers bisects the contact circle, the lines connecting the contact points, $(K_n)$ with the pitch point represent the normals to both cycloidal curves in contact, and the teeth radii of curvature, $(\rho)$ for that contact are coincident with that line. The other lines, described above, pass through the points of tangency to the cycloidal curves in contact at each mesh point, and the angle formed between the two lines which intersect at each mesh point is exactly ninety degrees. The instantaneous pressure angle, $(\alpha/2n)$ of each tooth pair is equal to the angle formed by the intersection of the line of centers and the line tangent to the contacting cycloidal curves. Pressure angles, $(\alpha/2n)$ vary from zero to ninety degrees.

The contact, $(K_5)$ nearest the line of centers and also closest to the internal gear center is solely resistant to mesh separating forces. It, therefore, sustains the lowest compressive loads since its pressure angle is effectively ninety degrees, while its sliding velocity is maximum. The loaded contact, $(K_o)$ most diametrically opposite (the one closest to the pitch point) to the separating force contact is almost solely sustaining torque, with its action that of nearly pure rolling, and therefore, a sliding velocity approaching zero, and a pressure angle, $(\alpha/2o)$ of nearly zero. This is the contact which resists the highest compressive load, but its compressive stress is still low due to the extremely large area of profile in contact between the driving and driven gear teeth, as compared with involute gears, even in the internal/external mesh condition. The tooth pairs in the loaded zone between these two extremes sustain proportionate shares of the two loaded modes depending upon their relative instantaneous positions. As their compressive load decreases, their sliding velocity increases, and vice versa.

A hunting tooth action is assured by virtue of the one tooth difference between numbers of teeth contained in the gear and pinion as an integral requirement of this gear mesh system. Each tooth of the pinion event-ually engages each tooth in the internal gear if sufficient revolutions are completed, and each tooth profile experiences the complete range of pressure angle, $(\alpha/2n)$ from ninety to zero degrees. With a reversing type of application, this also means that every point on each entire tooth profile will engage in driving contact with its counterpart on each tooth of the mating member.

The mesh contact, $(K_o)$ nearest the pitch point is designated as the "principal" contact wherein mating epicycloids of the two members are in intimate contact and mating hypocycloids of the two members are also in intimate contact. The remaining contacts, $(K_n)$ on the contact circle on the driving side of the line of centers are designated "secondary" contacts wherein only the hypocycloidal portion of the internal gear profiles contact only the epicycloidal portion of the external gear profiles. The principal contact mode is nearly that of pure rolling, while the secondary contacts modes are those of nearly pure sliding.

As the gears orbit and rotate with respect to each other, all of these contacts shift smoothly, with the effect that the secondary contact, ($K_1$) nearest the principal contact, ($K_o$) will next become the principal contact and the number two secondary contact, ($K_2$) will next become the number one secondary contact, ($K_1$) and so on. The principal contact will be smoothly relieved of its load as the number one contact assumes the principal contact position. Thus, there occurs a smooth transition of load carrying and of load shifting such that no one tooth pair ever assumes the full torque, alone, as is common in other types of gear sets. Mesh shock loads are not felt by any tooth pair in this type of cycloidal profile gear set.

With the internal gear of eleven teeth orbiting without rotation, with respect to the housing, about the external gear of ten teeth, the internal gear is required to complete ten circular orbits to cause the external gear to rotate one revolution. The external gear revolves in a direction that is counter to the direction of orbit of the internal gear.

At the same time the one internal gear is orbiting, the other internal gear is caused to orbit the same magnitude, but in the opposite direction by means of the interconnection through the sliding block and the pivot members, so that for each orbit, the axle shafts counter-rotate two tenths of a revolution relative to each other. Therefore, one complete revolution of one axle shaft relative to the other axle shaft requires five reciprocations of the sliding block with respect to the housing.

The preceding description of the effect of the gearing is the principal difference between the "gearless" sliding block and orbiting intermediate member differential and the limited slip version of the same mechanism.

L.S.D. NORMAL DIFFERENTIAL ACTION

As is universally understood, any vehicle differential must be capable of allowing the two coaxial axle shafts to rotate in opposite directions simultaneously relative to each other regardless of whether the differential housing is rotating or is not. Since this normal circumstance is most easily described and comprehended while housing is stationary, attention is now directed to FIGS. 8 and 18.

As was previously pointed out in the descriptive portion of this explanation, the lowermost gear 35 horizontal centerline is illustrated beneath the rotational centerline of the unit, while the uppermost gear 35 horizontal centerline lies above the rotational centerline. Referring back to the gear action explanation, this places the lowermost gearset pitch point near the upper vertical centerline and the uppermost gearset pitch point near the lower vertical centerline. Let us assume that the major tangential tooth forces occur at these pitch points and that the lower most side gear 45 is tending to rotate anti-clockwise, viewed in FIG. 8, while the uppermost side gear 45 is tending to rotate clockwise simultaneously.

The major tangential forces on both gear meshes are directed horizontally left, initially. Therefore, the axes of gears 35 and their associated tangs 38 initially start to move to the left. Because the tangs 38 of both gears 35 are slidably engaged within the slots 37 on opposite sides of the slide block 25, the slide block also begins to move toward the left, which motion is allowed, relative to the housing 11, by the parallel relationship of the bearing surfaces 28 and 29 in the housing and the bearing surfaces 26 and 27 on the block relative to the direction of slide block motion. In this instance, the counter-rotation of the two side gears 45 complement or assist each other in moving the slide block (FIG. 19).

As soon as the tangential mesh forces produce actual motion, however, the pitch points move also and in a rightward direction because the axes of gears 45 are stationary and the axes of gears 35 are starting to traverse the path of orbit in a leftward direction, and the pitch points lie diametrically opposite the orbit points which are coincident with the axes of gears 35 at all times.

Figure 20:
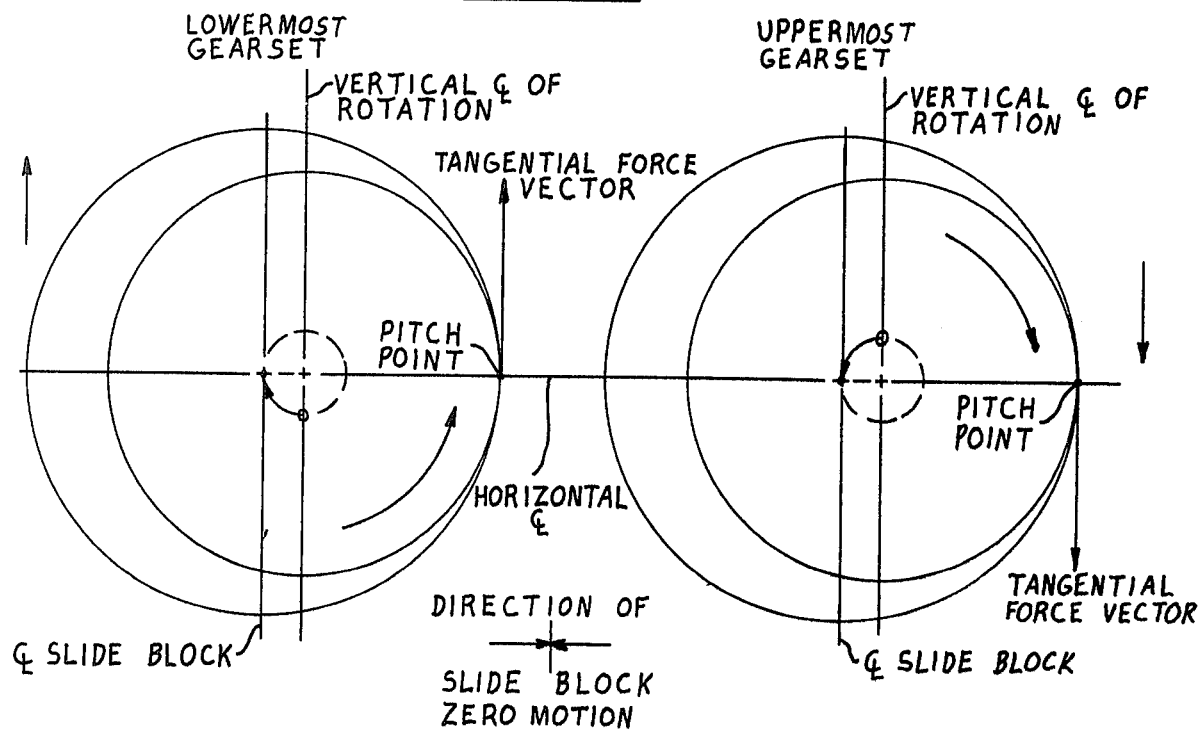

As the motions of the axes of gears 35 progress and the associated gear mesh pitch points also progress in like associated directions, so also do the locations and directions of the mesh tangential forces change. For example, the lowermost gear mesh tangential force application point (synonymous with pitch point) will have moved downward and to the right and its force vector will be directed to the left and upward. The horizontal component of this force vector serves to move the slide block 25 to the left and the vertical component of the force vector acts to move the lowermost internal gear 35 upward, its tangs sliding within the slide block slots at the same time. Concurrently, the uppermost gear 35 is doing the same thing but its force vector vertical component acts to move the uppermost gear downward. As these motions continue, the slide block reaches its maximum leftward position as the pitch points of both gear meshes coincide on the right hand horizontal rotational centerline and at the same time the axes of gears 35 superimpose on the left hand rotational horizontal centerline. At this point, the progression of the slide block 25 has momentarily stopped, preparatory to reversal of direction (FIG. 20).

Figure 21:
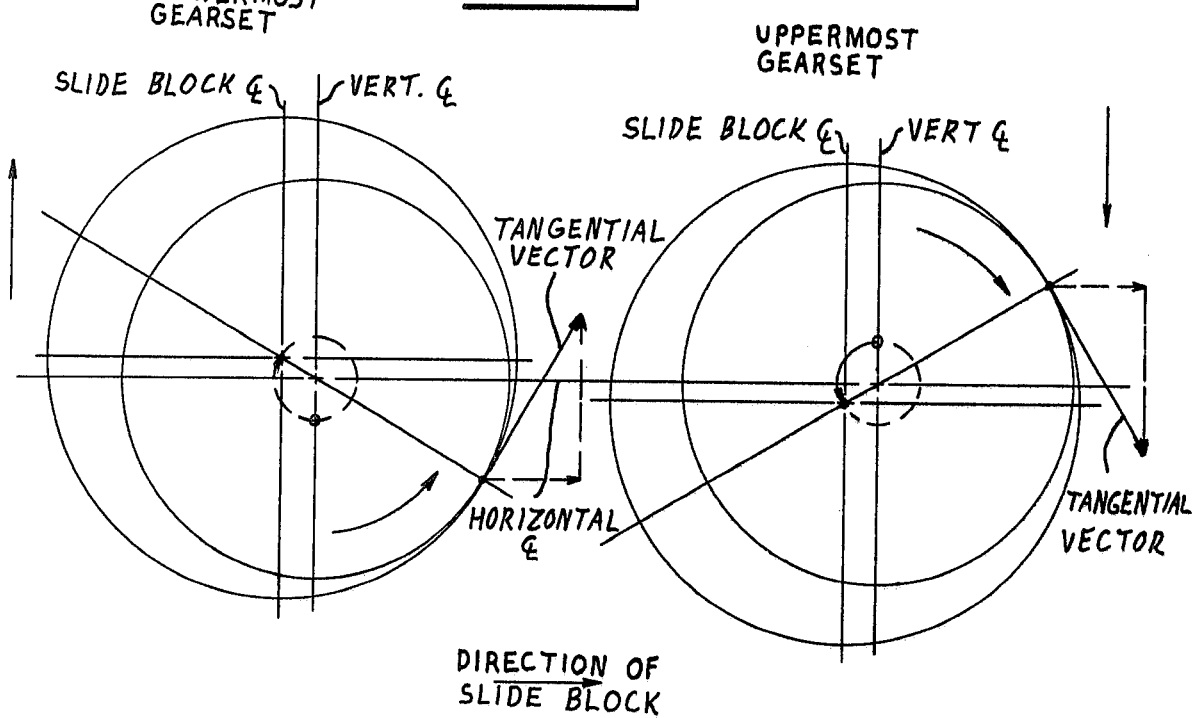

Referring to FIGS. 21 and 22, as the lowermost gear 35 continues its orbit in the clockwise direction, its pitch point is moving downward and leftward; its tangential force vector is still directed upward but has inclined rightward. The vector horizontal component is, therefore, urging the slide block to the right while the vertical vector component continues to move the orbiting gear 35 upward. Concurrently, the uppermost gear 35 is assisting the slide block rightward motion while it continues to move downward. Pivot members 42 effectively prevent either orbiting gear 35 from reversing its direction of orbit at the points where the axes of gears 35 coincide.

The reciprocation of the slide block and the orbiting and reciprocation of the gears 35 relative to the slide block 25 continues as long as counter-rotation of the external gears 45 continues. This action occurs regardless whether the housing is rotating or is not. Thus, under normal conditions, this mechanism differentiates with the same results as would a standard automotive bevel gear differential.

The foregoing analysis may be applied to the complete orbit for both gears 35, which will allow each side gear 45 to advance in its direction of rotation by the span of one circular pitch, or by 1/10 revolution when employing the 10 and 11 combination of tooth numbers. In relation to each other, the side gears 45 will have advanced two teeth or 1/5 revolution. It is to be remembered during the foregoing explanation, that all moving parts have operational clearances; i.e., there are no pre-loaded parts or assemblies within the enclosure. Another subject which must be well understood is this: this differential mechanism is based on an action-reaction concept and in the foregoing explanation of the action taking place during normal differentiation, where the side gears 45 are caused to counter-rotate, the reactions are complementary, that is, the motion inducing reaction from one side gear 45 is assisted by the motion inducing reaction of the opposite side gear 45. In this respect, it somewhat resembles a constant motion type of escapement mechanism.

NO DIFFERENTIAL ACTION

In straight ahead (or reverse) vehicle motion, where no differentiation is required, both axles and associated side gears 45 are rotating at the same velocity and in the same direction. In analyzing the differential components' motion under this condition, it will be found that all forces tending to cause action by one axle shaft will be equally but oppositely opposed by the other axle shaft reaction. For example, reference is made to FIGS. 8 and 23. Assume both side gears 45 are tending to rotate anti-clockwise. The lowermost gear 45 pitch point is on the upper vertical centerline of rotation and its associated tangential force vector is directed toward the left, thus urging the slide block 25 leftward. The uppermost gear 45 pitch point is on the lower vertical centerline of rotation and its associated tangential force vector is directed toward the right, urging the slide block 25 rightward. The slide block is therefore acted upon by two equal but opposite forces, precluding its reciprocation in either direction. The combined torques of the two axles are, therefore, transmitted directly to the housing 11 via the flat bearing surfaces common to the slide block and the housing, causing housing rotation in the same direction as the shafts.

The same thing applies during straight ahead (or reverse) locomotion, except that the housing is the driver, and since the axle shafts exhibit equal magnitude and unidirectional resisting torques, there can be no motion occurring within the differential housing, and the entire system of parts within the enclosure rotates with the enclosure, obviating differential motion.

LIMITED SLIP DIFFERENTIATION

As has been previously defined, housing 11 is the driving member, transmitting its torque through the parallel flat bearing surfaces 28 and 29 to the corresponding surfaces 26 and 27 of the sliding block 25, thence through slots 37 to the tangs 38 of the gears 35, thence through the gear teeth 36 to the teeth 47 of side gears 45, connected by splines 50 to axle shafts, through the associated final drive gear meshes, and so on to the tractive surface being traversed by the vehicle.

Let us now assume that one of the coaxial wheels loses its tractive contact with the ground surface, either imagining that one wheel is on wet ice or that one side of the axle housing is jacked up so that that wheel is clear of the ground while the opposite wheel maintains maximum traction such as contact with a dry, hard, concrete surface. The tendency is for normal differentiation to occur, at least through the axle having traction. In this case, the tractive axle and its associated moving parts within the enclosure will try to act as they did during normal differentiation. However, during normal differentiation, the other axle and its associated moving parts within the enclosure reacted to assist the axle which initiated the differential motions. Under the presently specified conditions, this assisting reaction is not available, or may be available only on a much reduced scale of magnitude.

The tractive axle must now cause whatever motion is to exist on both sets of parts within the enclosure to occur principally or entirely as a result of its action versus the reaction of the input members or enclosure, and also to cause the parts associated with the opposite axle to move and react against the enclosure, but in a different mode. In the limited slip condition under current consideration, the action will be as follows. Referring to FIGS. 8 and 24, assume a situation similar to that included in the explanation of normal differential action. Further assume that the lowermost side gear 45 is tending to rotate anti-clockwise, but that the uppermost side gear 45 has no rotational tendency.

The major tangential force on lowermost gear 45 is leftward initially, tending to move the mating orbiting gear 35 leftward, which urges sliding block 25 also leftward. In order for the sliding block to move leftward, however, it must cause the uppermost orbiting gear 35 to move also to the left initially. To do this, the uppermost gear 35 must cause its mating gear 45 to begin to rotate clockwise. This resulting motion is a speed-increasing ratio, and as such is of a lesser efficiency for transmitting motion.

Referring to FIG. 25, as the motion proceeds and the pitch point locations change positions, orbiting gear reciprocations relative to the sliding block also begin, as explained in the description for normal differential action. However, in the present mode, the uppermost orbiting gear 35 is driving the uppermost side gear 45 instead of the converse action which occurred in normal differentiation.

As the uppermost mesh pitch point location moves anti-clockwise, its tangential force reaction vector is directed rightward and upward. But for motion to occur, the uppermost gear 35 must move downward and leftward to cause clockwise rotation of uppermost side gear 45. There thus occurs a conflict between the direction in which the uppermost gear must travel, and the motion-producing force reaction vector imposed on the same uppermost orbiting gear.

In this analysis, with the enclosure stationary, it has been shown that it requires less effort to counter-rotate the axle shafts simultaneously than is required to force differentiation to occur when attempting to rotate a single axle shaft.

The analysis can be repeated after the forces introduced by a single shaft have caused motion of the parts internal of the enclosure, as was shown for normal differentiation, keeping in mind that the one shaft only is introducing force into the system, and the same conclusions will remain true.

During limited slip differential action, of course, the enclosure is the driving member and the axle with reduced traction fails to perform the complementary assisting reaction necessary for normal differential action. Therefore, the interaction of the moving parts depends upon the different course of action-reaction relationship, with the driving member supplying a portion of the missing reaction normally provided by the axle with diminished traction. In this manner, the greater quantity of input torque is directed to the axle whose wheel experiences the higher tractive coefficient.

The torque distribution is a smooth, shock-free, instantaneous transition in response to the relative traction conditions as they are encountered by each wheel, independently.

Rather than the speed-up of the minimum tractive axle that would occur in a conventional differential under the above conditions, the limited slip differential described herein causes the minimum tractive axle to continue to rotate at a velocity similar to that of the maximum tractive axle until such time as the tractive conditions under both coaxial wheels are nearly equal, dictating normal differentiation or no differentiation to occur as required by the course the vehicle is traversing.

I claim:

1. A differential disposed for rotation on a longitudinal axis thereof comprising a housing, a slide block, means mounting said slide block in said housing for rotation therewith and for permitting said slide block to reciprocate in a first direction perpendicular relative to said axis, a pair of intermediate members disposed on either side of said slide block and each having first driving means thereon, interengaging guide means formed on said slide block and on each of said intermediate members for permitting each intermediate member to reciprocate on said slide block in a second direction perpendicular relative to said first direction and relative to said axis, a pair of driven members each mounted for rotation about said axis on said housing and having second driving means thereon which engage with said first driving means of a respective one of said intermediate members whereby each intermediate member is adapted to orbit in a circular path about said axis, and means operatively interconnected between said slide block and each of said intermediate members for forcing said driven members to rotate in opposite directions during all phases of differentiation of said differential comprising a pair of cross-over control pivot members disposed on opposite sides of said slide block and pivotally mounted thereon.

2. The differential of claim 1 wherein said housing is generally cylindrical and has a pair of end plates releasably attached to opposite ends thereof.

3. The differential of claim 2 wherein each of said end plates is releasably attached to said housing by a snap ring disposed in a pair of radially aligned grooves formed in said housing and in one of said end plates.

4. The differential of claim 3 wherein each of said snap rings is semi-annular.

5. The differential of claim 4 wherein each of said snap rings extends approximately 296° circumferentially within a respective pair of said grooves formed on said housing and on one of said end plates.

6. The differential of claim 2 wherein a plurality of ports are formed through each of said end plates and adapted to communicate lubricant within said differential.

7. The differential of claim 1 further comprising a radial flange formed on an end of said housing and adapted to have a gear attached thereto to provide a drive input to said housing.

8. The differential of claim 1 further comprising a plurality of radially disposed passages formed circumferentially about said housing and adapted to communicate lubricant out of said differential.

9. The differential of claim 1 wherein the means mounting said slide block in said housing comprises a pair of parallel upper and lower flat bearing surfaces formed on said slide block and slidably engaged with a pair of flat and parallel bearing surfaces formed internally on said housing.

10. The differential of claim 9 wherein each of the bearing surfaces formed internally on said housing is interrupted by a cut-out and further comprising a magnet disposed in each said cut-out.

11. The differential of claim 10 further comprising a spring clip mounted in said cut-out and holding said magnet in place on said housing.

12. The differential of claim 1 wherein each of said driven members is rotatively mounted on said housing in axially aligned and spaced relationship thereon.

13. The differential of claim 12 wherein each of said driven members is rotatively mounted on said housing by a cylindrical bearing means mounted on said housing.

14. The differential of claim 13 wherein said housing is generally cylindrical and has a pair of end plates attached on opposite ends thereof and wherein the said bearing means is mounted internally on each of said end plates.

15. The differential of claim 12 further comprising an annular spacer and wherein inboard ends of said driven members are mounted on said spacer for rotation thereon.

16. The differential of claim 15 wherein said spacer has a radial flange formed thereon intermediate its axial length and wherein inboard ends of said driven members abut opposite sides of said flange.

17. The differential of claim 16 further comprising a cylindrical chamber formed internally of said spacer and a plurality of ports formed radially through said spacer and the flange thereof to communicate said chamber externally of said spacer.

18. The differential of claim 1 wherein said interengaging guide means comprises slots formed on opposite sides of said slide block and tangs formed on an inboard face of each of said intermediate members, the tangs formed on each of said intermediate members disposed in sliding relationship in the slots formed in a respective side of said slide block.

19. The differential of claim 18 wherein the tangs formed on the inboard face of each of said intermediate members constitute a pair of diametrically opposed tangs.

20. The differential of claim 19 further comprising a pair of diametrically opposed lugs formed on the inner face of each of said intermediate members and disposed in straddling relationship with opposite sides of said slide block.

21. The differential of claim 20 wherein said lugs are circumferentially offset ninety degrees relative to said tangs.

22. The differential of claim 1 wherein each of said pivot members comprises an intermediate semi-circular portion disposed in a slot formed in said slide block and wherein opposite ends of said pivot member are each disposed in a slot formed on a respective one of said intermediate members.

23. The differential of claim 1 wherein each of said first driving means is formed internally on a respective intermediate member and comprises a cylindrical cavity, therein, disposed in driving, rotational bearing relationship on a said second driving means which is formed externally on a respective one of said pair of driven members.

24. The differential of claim 23 wherein said cylindrical cavity is formed concentrically within said intermediate member and wherein each of said second driving means comprises a cylindrical journal having an axis parallel and eccentrically offset relative to the longitudinal and rotational axis of said differential to constitute a crankshaft, said journal disposed in the cylindrical cavity of said intermediate member in rotational bearing relationship therein.

25. The differential of claim 24 wherein an anti-friction bearing is disposed intermediate said cylindrical cavity in each said intermediate member and said eccentrically offset cylindrical journal on each said driven member.

26. The differential of claim 1 wherein each of said driven members includes a separable, splined axle adapted for connection to a vehicle driving wheel.

27. The differential of claim 24, wherein one revolution of said one of the driven members about its rotational axis compels the mating one of said intermediate members to orbit in the same direction through one complete circular orbit about said differential longitudinal axis.

28. The differential of claim 27 wherein the circular orbital motion of the one of said intermediate members is allowed by the reciprocation of said one intermediate member relative to said sliding block in said first direction concurrent with the reciprocation of said sliding block relative to said housing in said second direction perpendicular relative to said first direction wherein both first and second directions are perpendicular relative to said longitudinal axis whereby said orbital motion occurs without rotation of said intermediate member relative to said housing.

29. The differential of claim 28 wherein rotation of both said intermediate members relative to said housing is prevented by said inter-engaging guide means comprised of slots formed on opposite sides of said slide block and tangs formed on the inboard face of each of said intermediate members, the tangs formed on each intermediate member disposed in sliding relationship in the slots formed on a respective side of said slide block, preventing rotation of said intermediate members relative to said slide block, and wherein said means mounting said slide block in said housing is comprised of a pair of parallel flat bearing surfaces formed on said slide block disposed in sliding relationship with a pair of parallel flat bearing surfaces formed internally on said housing for preventing rotation of said slide block relative to said housing.

30. The differential of claim 29 wherein orbiting non-rotating motion of one of said intermediate members compels orbiting non-rotating motion of the other of said intermediate members in a direction opposite to the first one of the intermediate members.

31. The differential of claim 30 wherein counter-directional orbiting of the pair of intermediate members compels counter-directional rotation of the pair of driven members.

32. The differential of claim 30 wherein counter-directional orbiting of the two intermediate members is compelled by cross-over control pivot means operatively interconnected between said slide block and each of said intermediate members for forcing said intermediate members to reciprocate in opposite directions during all phases of differentiation of said differential.

33. The differential of claim 32 wherein unidirectional rotation of said driven members prevents counter-directional reciprocation and concurrent counter-directional orbiting of said intermediate members relative to said housing whereby torques imposed on said driven members are transmitted in albebraic average to said housing of said differential.

34. The differential of claim 33 wherein rotation of said housing of said differential on said longitudinal axis thereof in one direction compels concurrent rotation of said slide block and said pair of intermediate members therewith, apportioning housing imposed torque and unidirectional rotation between said driven members in the said one direction via said driven members eccentrically disposed bearing journals whenever said driven members sustain essentially equal resisting torques therebetween, thereby obviating differential motion therewith.

35. The differential of claim 34 wherein rotation of said housing on said longitudinal axis in one direction compels concurrent rotation of said slide block and said pair of intermediate members therewith, reciprocation of said slide block concurrent with counter-directional reciprocation of said pair of intermediate members perpendicular relative to said slide block reciprocation permits counter-directional orbiting of said intermediate members and concurrent counter-directional rotation of said driven members relative to said housing, to permit one of said driven members to rotate at a higher rate of speed and the other of said driven members to rotate at a lower rate of speed than said housing rotation, both driven members rotating in the same direction as said housing, whereby housing imposed torque is apportioned between said driven members in algebraic total whenever said driven members sustain unequal resisting torques therebetween, thereby providing differential motion therewithin.

36. The differential of claim 1 wherein said intermediate members comprise a pair of first gear members disposed on either side of said slide block and each having driving gear teeth formed internally thereon and said driven members comprise a pair of second gear members each mounted for rotation about said axis on said housing and having driving gear teeth formed externally thereon which mesh with and which are less in number than the gear teeth formed internally on a respective one of said first gear members whereby a pair of meshing first and second gear members form a gear set with the first gear member thereof being adapted to orbit in a circular path about said axis.

37. The differential of claim 36 wherein each of said second gear members is rotatively mounted on said housing in axially aligned and spaced relationship thereon.

38. The differential of claim 37 wherein each of said second gear members is rotatively mounted on said housing by a cylindrical bearing means mounted on said housing.

39. The differential of claim 38 wherein said housing is generally cylindrical and has a pair of end plates attached on opposite ends thereof and wherein the said bearing means is mounted integrally on each of said end plates.

40. The differential of claim 36 further comprising an annular spacer and wherein inboard ends of said second gear members are mounted on said spacer for rotation thereon.

41. The differential of claim 40 wherein said spacer has a radial flange formed thereon intermediate its axial length and wherein inboard ends of said second gear members abut opposite sides of said flange.

42. The differential of claim 41 further comprising a cylindrical chamber formed internally of said spacer and a plurality of ports formed radially through said spacer and the flange thereof to communicate said chamber externally of said spacer.

43. The differential of claim 36 wherein said driving gear teeth formed internally of each said first gear member comprises equally spaced full cycloidal profile gear teeth, the pitch cylinder of which is concentric therein with said first gear member axis.

44. The differential of claim 43 wherein said driving gear teeth formed externally of each of said second gear members comprises equally spaced full cycloidal profile gear teeth which are one less in number than the gear teeth formed internally of the first gear members and wherein the pitch cylinder of the second gear member is concentric with said second gear member axis.

45. The differential of claim 44 wherein said second gear members are each contiguously disposed within one of said first gear members forming a cycloidal gear set wherein the pitch cylinder of said first gear member is in continuous tangential relationship with the pitch cylinder of said second gear member and the axis of said first gear member is maintained in eccentrically offset parallelism with the axis of said second gear member by the multiple tooth contacts therebetween, said first gear member adapted to orbit in a non-rotating circular path about said differential longitudinal axis compelling said second gear member to rotate in a direction counter to the direction of orbit of said first gear member.

46. The differential of claim 45 wherein the said circular orbital motion of the one of said first gear members is allowed by the reciprocation of said firt gear member relative to said sliding block in a first direction concurrent with the reciprocation of said sliding block relative to said housing in a second direction perpendicular relative to said first direction wherein both first and second directions are perpendicular relative to said longitudinal axis whereby said orbital motion occurs without rotation of said first gear member relative to said housing.

47. The differential of claim 46 wherein rotation of both of said first gear members relative to said housing is prevented by said inter-engaging guide means comprised of slots formed on opposite sides of said slide block and tangs formed on each of said first gear members disposed in sliding relationship in the slots formed on a respective side of said slide block for preventing rotation of said first gear members relative to said slide block and wherein said means mounting said slide block in said housing is comprised of a pair of parallel flat bearing surfaces formed on said slide block disposed in sliding relationship with a pair of parallel flat bearing surfaces formed internally on said housing for preventing rotation of said slide block relative to said housing.

48. The differential of claim 47 wherein orbiting non-rotating motion of one of said first gear members compels orbiting non-rotating motion of the other of said first gear members in a direction opposite to the first one of said first gear members.

49. The differential of claim 48 wherein counter-directional orbiting of the pair of first gear members compels counter-directional rotation of the pair of second gear members.

50. The differential of claim 48 wherein counter-directional orbiting of the two first gear members is compelled by cross-over control pivot means operatively interconnected between said slide block and each of said first gear members for forcing said first gear members to reciprocate in opposite directions during all phases of differentiation of said differential.

51. The differential of claim 50 wherein unidirectional rotation of said second gear members prevents counter-directional reciprocation and concurrent counter-directional orbiting of said first gear members relative to said housing whereby torques imposed on said second gear members are transmitted in algebraic average to said housing of said differential.

52. The differential of claim 51 wherein rotation of said housing of said differential on said longitudinal axis thereof in one direction compels concurrent rotation of said slide block and said pair of first gear members therewith, apportioning housing imposed torque and unidirectional rotation between the said second gear members in the said one direction via said second gear members eccentrically disposed cylinder of tooth contacts whenever said second gear members sustain substantially equal resisting torque therebetween, thereby obviating differential motion therewithin.

53. The differential of claim 52 wherein rotation of said housing of said differential on said longitudinal axis thereof in one direction compels concurrent rotation of said slide block and said pair of first gear members therewith, reciprocation of said slide block concurrent with counter-directional reciprocation of said pair of first gear members perpendicular relative to said slide block reciprocation permits counter-directional orbiting of said first gear members and concurrent counter-directional rotation of said second gear members relative to said housing, to permit one of said second gear members to rotate at a higher rate of speed and the other of said second gear members to rotate at a lower rate of speed than said housing is rotating, both second gear members rotating in the same direction as said housing, whereby housing imposed torque is apportioned between said second gear members in algebraic total whenever said second gear members sustain unequal resisting torques therebetween, thereby providing differential motion therewithin.

54. A differential disposed for rotation on a longitudinal axis thereof comprising
a generally cylindrical housing having a pair of end plates releasably attached to opposite ends thereof, and wherein each of said end plates is releasably attached to said housing by a snap ring disposed in a pair of radially aligned grooves formed in said housing and in one of said end plates,
a slide block,
means mounting said slide block in said housing for rotation therewith and for permitting said slide block to reciprocate in a first direction perpendicular relative to said axis,
a pair of intermediate members disposed on either side of said slide block and each having first driving means thereon,
interengaging guide means formed on said slide block and on each of said intermediate members for permitting each intermediate member to reciprocate on said slide block in a second direction perpendicular relative to said first direction and relative to said axis, a pair of driven members each mounted for rotation about said axis on said housing and having second driving means thereon which engage with said first driving means of a respective one of said intermediate members whereby each intermediate member is adapted to orbit in a circular path about said axis, and means operatively interconnected between said slide block and each of said intermediate members for forcing said driven members to rotate in opposite directions during all phases of differentiation of said differential.

55. A differential disposed for rotation on a longitudinal axis thereof comprising a generally cylindrical housing having a pair of end plates releasably attached to opposite ends thereof, and wherein a plurality of ports are formed through each of said end plates and adapted to communicate lubricant within said differential, a slide block, means mounting said slide block in said housing for rotation therewith and for permitting said slide block to reciprocate in a first direction perpendicular relative to said axis, a pair of intermediate members disposed on either side of said slide block and each having first driving means thereon, interengaging guide means formed on said slide block and on each of said intermediate members for permitting each intermediate member to reciprocate on said slide block in a second direction perpendicular relative to said first direction and relative to said axis, a pair of driven members each mounted for rotation about said axis on said housing and having second driving means thereon which engage with said first driving means of a respective one of said intermediate members whereby each intermediate member is adapted to orbit in a circular path about said axis, and means operatively interconnected between said slide block and each of said intermediate members for forcing said driven members to rotate in opposite directions during all phases of differentiation of said differential.

56. A differential disposed for rotation on a longitudinal axis thereof comprising a housing, a slide block, means mounting said slide block in said housing for rotation therewith and for permitting said slide block to reciprocate in a first direction perpendicular relative to said axis comprising a pair of parallel upper and lower flat bearing surfaces formed on said slide block and slidably engaged with a pair of flat and parallel bearing surfaces formed internally on said housing and wherein each of the bearing surfaces formed internally on said housing is interrupted by a cut-out and further comprising a magnet disposed in each said cut-out, a pair of intermediate members disposed on either side of said slide block and each having first driving means thereon, interengaging guide means formed on said slide block and on each of said intermediate members for permitting each intermediate member to reciprocate on said slide block in a second direction perpendicular relative to said first direction and relative to said axis, a pair of driven members each mounted for rotation about said axis on said housing and having second driving means thereon which engage with said first driving means of a respective one of said intermediate members whereby each intermediate member is adapted to orbit in a circular path about said axis, and means operatively interconnected between said slide block and each of said intermediate members for forcing said driving members to rotate in opposite directions during all phases of differentiation of said differential.

57. A differential disposed for rotation on a longitudinal axis thereof comprising a housing, a slide block, means mounting said slide block in said housing for rotation therewith and for permitting said slide block to reciprocate in a first direction perpendicular relative to said axis, a pair of intermediate members disposed on either side of said slide block and each having first driving means thereon, interengaging guide means formed on said slide block and on each of said intermediate members for permitting each intermediate member to reciprocate on said slide block in a second direction perpendicular relative to said first direction and relative to said axis, a pair of driven members each mounted for rotation about said axis on said housing and having second driving means thereon which engage with said first driving means of a respective one of said intermediate members whereby each intermediate member is adapted to orbit in a circular path about said axis, said driven members being rotatably mounted on said housing in axially aligned and spaced relationship thereon and wherein each of said driven members is rotatably mounted on said housing by a cylindrical bearing means mounted on said housing, and means operatively interconnected between said slide block and each of said intermediate members for forcing said driven members to rotate in opposite directions during all phases of differentiation of said differential.

58. A differential disposed for rotation on a longitudinal axis thereof comprising a housing, a slide block, means mounting said slide block in said housing for rotation therewith and for permitting said slide block to reciprocate in a first direction perpendicular relative to said axis, a pair of intermediate members disposed on either side of said slide block and each having first driving means thereon, interengaging guide means formed on said slide block and on each of said intermediate members for permitting each intermediate member to reciprocate on said slide block in a second direction perpendicular relative to said first direction and relative to said axis, a pair of driven members each mounted for rotation about said axis on said housing and having second driving means thereon which engage with said first driving means of a respective one of said intermediate members whereby each intermediate member is adapted to orbit in a circular path about said axis, said driven members being rotatably mounted on said housing in axially aligned and spaced relationship thereon and an annular spacer and wherein inboard ends of said driven members are mounted on said spacer for rotation thereon, and means operatively interconnected between said slide block and each of said intermediate members for forcing said driven members to rotate in opposite directions during all phases of differentiation of said differential.

59. A differential disposed for rotation on a longitudinal axis thereof comprising a housing, a slide block, means mounting said slide block in said housing for rotation therewith and for permitting said slide block to reciprocate in a first direction perpendicular relative to said axis, a pair of intermediate members disposed on either side of said slide block and each having first driving means thereon, interengaging guide means formed on said slide block and on each of said intermediate members for permitting each intermediate member to reciprocate on said slide block in a second direction perpendicular relative to said first direction and relative to said axis, a pair of driven members each mounted for rotation about said axis on said housing and having second driving means thereon which engage with said first driving means of a respective one of said intermediate members whereby each intermediate member is adapted to orbit in a circular path about said axis, and means operatively interconnected between said slide block and each of said intermediate members for forcing said driven members to rotate in opposite directions during all phases of differentiation of said differential and wherein each of said first driving means is formed internally on a respective intermediate member and comprises a cylindrical cavity therein, disposed in driving, rotational bearing relationship on a said second driving means which is formed externally on a respective one of said pair of driven members, said cylindrical cavity being formed concentrically within said intermediate member, each of said second driving means comprising a cylindrical journal having an axis parallel and eccentrically offset relative to the longitudinal and rotational axis of said differential to constitute a crankshaft, said journal disposed in the cylindrical cavity of said intermediate member in rotational bearing relationship therein, and an anti-friction bearing is disposed intermediate said cylindrical cavity in each said intermediate member and said eccentrically offset cylindrical journal on each said driven member.

60. A differential disposed for rotation on a longitudinal axis thereof comprising a housing, a slide block, means mounting said slide block in said housing for rotation therewith and for permitting said slide block to reciprocate in a first direction perpendicular relative to said axis, a pair of intermediate members disposed on either side of said slide block and each having first driving means thereon, interengaging guide means formed on said slide block and on each of said intermediate members for permitting each intermediate member to reciprocate on said slide block in a second direction perpendicular relative to said first direction and relative to said axis, a pair of driven members each mounted for rotation about said axis on said housing and having second driving means thereon which engage with said first driving means of a respective one of said intermediate members whereby each intermediate member is adapted to orbit in a circular path about said axis, and means operatively interconnected between said slide block and each of said intermediate members for forcing said driven members to rotate in opposite directions during all phases of differentiation of said differential and wherein said intermediate members comprise a pair of first gear members disposed on either side of said slide block and each having driving gear teeth formed internally thereon and said driven members comprise a pair of second gear members each mounted for rotation about said axis on said housing and having driving gear teeth formed externally thereon which mesh with and which are less in number than the gear teeth formed internally on a respective one of said first gear members whereby a pair of meshing first and second gear members form a gear set with the first gear member thereof being adapted to orbit in a circular path about said axis.

* * * * *